US011866601B2

(12) United States Patent
Asakawa et al.

(10) Patent No.: US 11,866,601 B2
(45) Date of Patent: Jan. 9, 2024

(54) INK SET AND PRINTING METHOD

(71) Applicant: Seiko Epson Corporation, Tokyo (JP)

(72) Inventors: Yuta Asakawa, Azumino (JP); Mitsuaki Kosaka, Minowa (JP); Akira Mizutani, Matsumoto (JP); Akiko Matsuzaki, Matsumoto (JP)

(73) Assignee: SEIKO EPSON CORPORATION ( * ) Notice: Subject to any disclaimer, the term of this patent is extended or adjusted under 35 U.S.C. 154(b) by 199 days.

(21) Appl. No.: 17/409,926

(22) Filed: Aug. 24, 2021

(65) Prior Publication Data
US 2022/0064472 A1 Mar. 3, 2022

(30) Foreign Application Priority Data
Aug. 25, 2020 (JP) .................. 2020-141529

(51) Int. Cl.
C09D 11/54 (2014.01)
C09D 11/107 (2014.01)
(Continued)

(52) U.S. Cl.
CPC ............ C09D 11/54 (2013.01); B41J 2/2107 (2013.01); B41J 2/2114 (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2011/0242200 A1* 10/2011 Tojo ................... B41M 7/009
347/21
2016/0289479 A1 10/2016 Okuda
(Continued)

FOREIGN PATENT DOCUMENTS

CN 108659618 A 10/2018
JP 2016-196177 A 11/2016

Primary Examiner — Manish S Shah
(74) Attorney, Agent, or Firm — Harness, Dickey & Pierce, P.L.C.

(57) ABSTRACT

An ink set includes an ink composition and a treatment liquid composition. Each of the ink composition and the treatment liquid composition is used for printing by being applied onto a printing medium by an ink jet method. The ink composition is a water-based composition containing a coloring material and a surfactant. The treatment liquid composition is a water-based composition containing a flocculant and a surfactant. Any one of the ink composition and the treatment liquid composition contains a nitrogen-containing solvent. Each of the surfactant contained in the ink composition and the surfactant contained in the treatment liquid composition includes a silicone surfactant whose 0.1 mass % aqueous solution has a surface tension of 32 mN/m or less. Any one of the surfactant contained in the ink composition and the surfactant contained in the treatment liquid composition includes a silicone surfactant whose 0.1 mass % solution in a nitrogen-containing solvent has a surface tension of 32 mN/m or less.

14 Claims, 3 Drawing Sheets

(51) Int. Cl.
*B41M 5/00* (2006.01)
*C09D 11/38* (2014.01)
*C09D 11/40* (2014.01)
*C09D 11/033* (2014.01)
*B41J 2/21* (2006.01)

(52) U.S. Cl.
CPC ......... *B41M 5/0023* (2013.01); *C09D 11/033* (2013.01); *C09D 11/107* (2013.01); *C09D 11/38* (2013.01); *C09D 11/40* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2016/0311233 A1* | 10/2016 | Murai | B41J 2/2107 |
| 2017/0165979 A1* | 6/2017 | Ohta | B41M 7/009 |
| 2018/0082564 A1 | 3/2018 | Fang et al. | |
| 2018/0273789 A1* | 9/2018 | Matsuzaki | B41J 2/1652 |
| 2018/0282567 A1* | 10/2018 | Ishida | D06P 1/54 |
| 2018/0291217 A1* | 10/2018 | Kagata | C09D 11/10 |
| 2019/0352524 A1* | 11/2019 | Yatake | B41M 5/0023 |
| 2021/0198503 A1* | 7/2021 | Yatake | C08G 18/222 |
| 2021/0371687 A1* | 12/2021 | Ishida | C09D 11/36 |
| 2023/0023979 A1* | 1/2023 | Asakawa | C09D 11/36 |

\* cited by examiner

INK SET AND PRINTING METHOD

The present application is based on, and claims priority from JP Application Serial Number 2020-141529, filed Aug. 25, 2020, the disclosure of which is hereby incorporated by reference herein in its entirety.

BACKGROUND

1. Technical Field

The present disclosure relates to an ink set and a printing method.

2. Related Art

Ink jet printing methods using water-based ink jet inks (hereinafter referred to as water-based inks) are studied.

For example, JP-A-2016-196177 disclosed a printing method of printing an image using a treatment liquid containing a flocculant.

Further improved image quality is desired in the ink jet printing method using water-based inks and a treatment liquid containing a flocculant.

SUMMARY

The present disclosure provides an ink set including an ink composition and a treatment liquid composition, and each of the ink composition and the treatment liquid composition is used for printing by being applied onto a printing medium by an ink jet method. The ink composition is a water-based composition containing a coloring material and a surfactant. The treatment liquid composition is a water-based composition containing a flocculant and a surfactant. Any one of the ink composition and the treatment liquid composition contains any one of a nitrogen-containing solvent, a sulfur-containing solvent, and a cyclic ester. Each of the surfactant contained in the ink composition and the surfactant contained in the treatment liquid composition includes a silicone surfactant whose 0.1 mass % aqueous solution has a surface tension of 32 mN/m or less, and any one of the surfactant contained in the ink composition and the surfactant contained in the treatment liquid composition includes a silicone surfactant whose 0.1 mass % solution in a nitrogen-containing solvent has a surface tension of 32 mN/m or less.

The present disclosure also provides a printing method using the ink set. The method includes applying the ink composition onto a printing medium by an ink jet method, and applying the treatment liquid composition onto the printing medium by an ink jet method.

DESCRIPTION OF EXEMPLARY EMBODIMENTS

Figure 1:
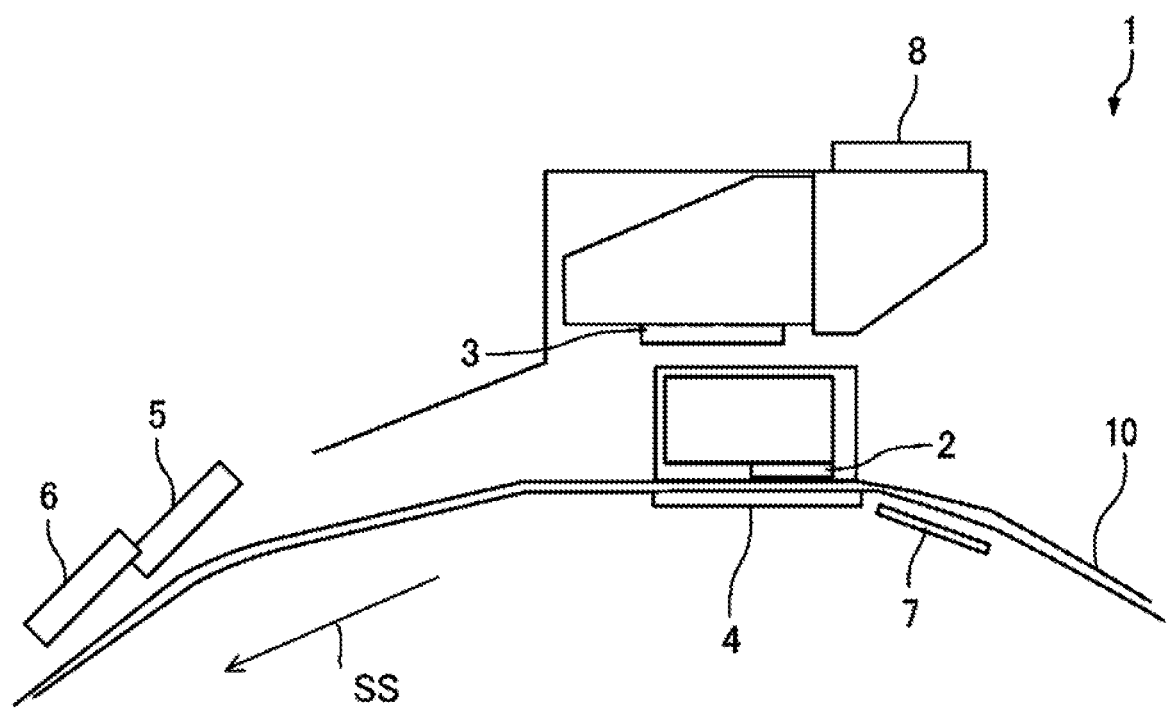
FIG. 1 is a schematic sectional view of an ink jet printing apparatus.

Some embodiments of the present disclosure will now be described. The following embodiments are described by way of example to explain the present disclosure. The present disclosure is not limited to the following embodiments, and various modifications may be made within the scope and spirit of the disclosure. Not all the components disclosed in the following embodiments are necessarily essential for implementing the concept of the disclosure.

The ink set and printing method according to an embodiment of the disclosure will now be described.

1. INK COMPOSITION

The ink set disclosed herein includes a water-based ink composition. The ink composition (also referred to as the water-based ink or the ink) will first be described.

The ink composition, as well as the treatment liquid composition containing a flocculant as described later herein, is a component of the ink set disclosed herein.

The ink composition is used for printing by being applied onto printing media by an ink jet method. Such an ink composition is also referred to as an ink jet ink. More specifically, the ink composition is ejected for printing from an ink jet head onto a printing medium. The ink composition is a water-based composition. A water-based composition is a composition containing water as one of the major solvents. The water content of a water-based composition is typically 40% or more.

The ink composition disclosed herein contains a coloring material and a surfactant. The ink composition may optionally contain an organic solvent, a resin, a wax, an antifoaming agent, and other additives.

1. 1. Water

The ink composition disclosed herein contains water. The water is a dominant medium of the water-based ink jet ink composition and is evaporated by drying. The water may be pure water or ultra-pure water from which ionic impurities are removed as much as possible. Examples of such water include ion-exchanged water, ultrafiltered water, reverse osmosis water, and distilled water. Sterile water prepared by, for example, UV irradiation or the addition of hydrogen peroxide may be used. Sterile water can reduce the development of mold and bacteria and is therefore beneficial for preserving the water-based ink composition for a long period.

The water content may be 40% or more, for example, 45% or more, 50% or more, or 60% or more, relative to the total mass of the ink composition. The upper limit of the water content is less than 100% by mass, for example, 98% by mass.

1. 2. Surfactant A

In any embodiment of the present disclosure, the surfactant in the ink composition and the surfactant in the treatment liquid composition described later herein, each include a silicone surfactant whose 0.1 mass % aqueous solution has a surface tension of 32 mN/m or less. Silicone surfactants whose 0.1 mass % aqueous solution has a surface tension of 32 mN/m or less are hereinafter referred to as surfactant A. Silicone surfactant A in the ink composition and silicone surfactant A in the treatment liquid composition may be the same or different. The surfactant content of this solution is 0.1% relative to the total mass of the solution.

Surfactant A in the ink and treatment liquid compositions increases the wettability of the compositions on the printing medium. Immediately after the ink and treatment liquid compositions have reached the printing medium, the liquid compositions are in a state where water remains in the liquid compositions, without much evaporating, to the extent that the ink dots and the treatment liquid dots can spread sufficiently on the printing medium. Consequently, the ink dots and the treatment dots come into contact with each other to cause the ink components to react with the flocculant in the treatment liquid, producing a high quality image. Also, the ink dots spreading sufficiently can cover and fill an area of the surface of the printing medium.

Furthermore, surfactant A helps the ink and the like to sufficiently wet the surfaces of head components or members to reduce air bubbles formed in the ink in the head, thus reducing ejection failure. Also, surfactant A facilitates consistent ink ejection and smooth flow in the head.

Ink or the like can dry within the head and cause solids in the ink to stick to an interior part of the head, such as a presser chamber or a region between the pressure chamber and the nozzle face, clogging the head.

For example, when the dispersion of the resin and pigment particles in ink is broken and cannot be recovered, the particles stick without redispersing. This is a cause of clogging. Once the pigment dispersant or the resin dissolves, the particles are unlikely to maintain the dispersion or redisperse. Surfactant A is less hydrophobic (more hydrophilic) than surfactant B described later herein and unlikely to dissolve resin components. Accordingly, surfactant A is unlikely to cause the solid components in the ink to stick, suppressing the increase of clogging.

For measuring the surface tension, water and the silicone surfactant are mixed in a mass ratio of 99.9:0.1 to prepare an aqueous solution. Surface tension used herein is a static surface tension measured by the Wilhelmy method. For example, the surface tension of the silicone surfactant can be determined by measuring the surface tension of the surfactant solution wetting a platinum plate at 25° C. with, for example, an automatic surface tensiometer CBVP-Z (manufactured by Kyowa Interface Science).

The silicone surfactant is a compound with a silicone chain in the molecule, such as a polysiloxane compound. The polysiloxane compound has a polysiloxane structure. The polysiloxane structure may be a polyorganosiloxane backbone or the like. The silicone surfactant may be a polyester-modified silicone containing a polyalkylene oxide chain.

In some embodiments, polysiloxane compounds are used as the silicone surfactant. Examples of polysiloxane compounds include, but are not limited to, polyether-modified organosiloxanes. Polyether-modified organosiloxanes are commercially available, and examples thereof include BYK-306, BYK-307, BYK-333, BYK-341, BYK-345, BYK-346, and BYK-348 (all produced by BYK); KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all produced by Shin-Etsu Chemical); and SILFACE SAG503A and SILFACE SAG014 (both produced by Nissin Chemical Industry).

Surfactant A can be selected from those silicone surfactants through a surface tension measurement for ensuring that 0.1 mass % aqueous solution has a surface tension of 32 mN/m or less. For example, surfactant A may be, but is not limited to, SILFACE SAG503A (produced by Nissin Chemical Industry) or TEGO WET 280 (produced by Evonik Industries).

The Surfactant A content of the ink and treatment liquid compositions may be 0.05% or more relative to the total mass of the composition. Also, the surfactant A content may be 5% by mass or less. In some embodiments, the surfactant A content may be, by mass, 0.1% to 4%, 0.5% to 3%, or 0.8% to 2% and, particularly, 1% to 1.5%. When the surfactant A content is in such a range, the ink and treatment liquid compositions can produce high-quality images and facilitate recovery from clogging. The surface tension of 0.1 mass % surfactant A aqueous solution may be 10 mN/m to 32 mN/m, for example, 15 mN/m to 30 mN/m or 20 mN/m to 25 mN/m.

1. 3. Surfactant B

In any embodiment of the present disclosure, either the surfactant in the ink composition or the surfactant in the treatment liquid includes a silicone surfactant whose 0.1 mass % solution in a nitrogen-containing solvent has a surface tension of 32 mN/m or less. Silicone surfactants whose 0.1 mass % solution in a nitrogen-containing solvent has a surface tension of 32 mN/m or less are hereinafter referred to as surfactant B.

The solution of the surfactant in a nitrogen-containing solvent is prepared by mixing the nitrogen-containing solvent with the surfactant in a mass ratio of 99.9:0.1. The surfactant content of this mixture, or solution, is 0.1% relative to the total mass of the mixture. The surface tension of this solution is measured in the same manner as described above.

The nitrogen-containing solvent used for measuring the surface tension of surfactant B can be selected from the nitrogen-containing solvents facilitating surface tension measurement, described below. For example, amide-based solvents, particularly 2-pyrrolidone, may be used. Solutions of 0.1 mass % of the surfactant in any nitrogen-containing solvent tend to have similar surface tensions. However, when the surface tensions vary among the mixtures, an amide-based solvent, particularly 2-pyrrolidone, is used to measure the surface tension.

Incidentally, either the ink or the treatment liquid contains a solvent selected from a nitrogen-containing solvent, a sulfur-containing solvent, and a cyclic ester. When either the ink or the treatment liquid contains a nitrogen-containing solvent, a sulfur-containing solvent, or a cyclic ester and either contains surfactant B, the mixture of the ink with the treatment liquid can favorably spread on and wet the printing medium. Thus, the nitrogen-containing solvent of the 0.1 mass % surfactant solution is not necessarily the same as and may be different from the nitrogen-containing solvent contained in the ink or the treatment liquid.

At least either the ink composition or the treatment liquid contains surfactant B. Both may contain surfactant B. In this instance, silicone surfactant B in the ink composition and silicone surfactant B in the treatment liquid may be the same or different.

Adding surfactant B to either the ink composition or the treatment liquid composition increases the wettability of the compositions on the printing medium. In particular, the ink and treatment liquid dots (droplets) can spread more favorably on the printing medium when water evaporates from the ink and the treatment liquid on the printing medium to increase their organic solvent contents. Consequently, the ink dots spread fully and sufficiently cover and fill an intended area of the surface of the printing medium. The spread ink can react completely to form a high-quality image. Surfactant B functions after surfactant A functions to sufficiently spread the ink and the treatment liquid to bring the compositions into contact with each other. Consequently, image quality is improved.

Also, images thus printed are more resistant to rubbing. In an embodiment, both the ink and the treatment liquid contain surfactant B. Such an ink set can produce high image quality. Surfactant B is more hydrophobic than surfactant A and can reduce the efficiency of recovery from clogging. Accordingly, in some embodiments, surfactant B is added to the treatment liquid.

The surfactant B content of the ink and treatment liquid compositions may be 0.05% or more relative to the total mass of the composition. Also, the surfactant B content may be 5% by mass or less. In some embodiments, the surfactant B content may be, by mass, 0.1% to 4%, 0.2% to 3%, 0.3% to 2%, or 0.5% to 1.5% and, particularly, 0.8% to 1%. Such a surfactant B content is beneficial for improving image quality and rub resistance.

The surface tension of 0.1 mass % surfactant B solution in a nitrogen-containing solvent may be 10 mN/m to 32 mN/m, for example, 15 mN/m to 30 mN/m or 20 mN/m to 28 mN/m.

Surfactant B can be selected from the silicone surfactants cited above through a surface tension measurement for ensuring that 0.1 mass % solution in a nitrogen-containing solvent has a surface tension of 32 mN/m or less. For example, surfactant B may be, but not limited to, SILFACE SAG008 (produced by Nissin Chemical Industry) or BYK-333 (produced by BYK).

1. 4. Surfactant A and Surfactant B

The surfactant contained in the ink composition or the treatment liquid may include a silicone surfactant whose 0.1 mass % aqueous solution and 0.1 mass % solution in a nitrogen-containing solvent have surface tensions of 32 mN/m or less. Such a surfactant is referred to as surfactant AB. Surfactant AB functions as surfactant A and surfactant B. Hence, ink and treatment liquid compositions containing surfactant AB are considered to be compositions containing surfactants A and B.

Examples of surfactant AB include, but not limited to, SILFACE SAG005 (produced by Nissin Chemical Industry) and TEGO WET 270 (produced by Evonik Industries).

The ink or the treatment liquid may contain a silicone surfactant that is a silicone surfactant whose 0.1 mass % aqueous solution has a surface tension of 32 mN/m or less but is not a silicone surfactant whose 0.1% mass % solution in a nitrogen-containing solvent has a surface tension of 32 mN/m or less. Hence, the ink or the treatment liquid may contain a surfactant that is surfactant A but is not surfactant B. This surfactant is surfactant A and is here referred to as surfactant a. Examples of surfactant a includes BYK-348 (produced by BYK) and some of the surfactants cited above.

Also, the ink or the treatment liquid may contain a silicone surfactant that is not a silicone surfactant whose 0.1 mass % aqueous solution has a surface tension of 32 mN/m or less but is a silicone surfactant whose 0.1% mass % solution in a nitrogen-containing solvent has a surface tension of 32 mN/m or less. Hence, the ink or the treatment liquid may contain a surfactant that is surfactant B but is not surfactant A. This surfactant is surfactant B and is here referred to as surfactant b. Some of the surfactants cited above are Surfactant b.

Using the treatment liquid containing surfactant B is more effective in recovery from clogging. Also, using the ink containing surfactant a as surfactant A is more effective in recovery from clogging. Surfactant AB can function sufficiently as surfactants A and B even when the surfactant content of the composition is relatively low.

The treatment liquid containing surfactant AB or surfactant b, particularly surfactant AB, is particularly effective in recovery from clogging. Surfactant b functions effectively as Surfactant B. The treatment liquid may contain surfactant b.

In exemplary embodiments, the ink contains surfactant a, whereas the treatment liquid contains surfactant AB or surfactants a and b.

The total content of surfactants A and B in the ink and treatment liquid compositions may be 0.1% or more relative to the total mass of the composition. Also, the total content of surfactants A and B in the compositions may be 6% by mass or less. In particular, the total content of surfactants A and B may be, by mass, 0.1% to 5%, 0.5% to 3%, 0.8% to 2%, or 1% to 1.5%. When the total content of surfactants A and B is in such a range, the compositions increase image quality and rub resistance and are effective in recovery from clogging.

In the ink composition, the proportion of surfactant A to the total mass (100%) of surfactants A and B may be 30% or more, 50% or more, 60% or more, 80% or more, or 90% or more. The upper limit is 100%. The ink composition containing Surfactant A in such a proportion is effective in recovery from clogging. In particular, when the surfactant a content is in such a range, the ink composition is beneficial.

When both surfactants A and B are used in the ink or treatment liquid composition, the surfactant A content may be controlled to higher than the surfactant B content, for example, by 0.1% to 3% or more or 0.3% to 1% or more from the viewpoint of facilitating recovery from clogging.

Before adding surfactants A and B, the surface tensions of their 0.1 mass % solutions in water and in a nitrogen-containing solvent are measured for confirmation.

Silicone surfactants having relatively low molecular weights (average molecular weights) tend to be surfactant A, and silicone surfactants having relatively high molecular weights tend to be surfactant B. Also, silicone surfactants having relatively intermediate molecular weights tend to be surfactant AB.

For selecting surfactants A and B, accordingly, the molecular weights of a plurality of silicone surfactants prepared in advance are measured, and the surfactants are listed in an order of molecular weight. Then, the surface tensions of 0.1 mass % aqueous solution and 0.1 mass % solution in a nitrogen-containing solvent of some of the surfactants are measured and checked whether the surfactant can be surfactant A or B for estimating which type all the surfactants are. For example, surfactants listed in increasing order of molecular weight are likely to be in order from a surfactant most possible to be surfactant A to a surfactant most possible to be surfactant B. Also, surfactants listed in increasing order of molecular weight are likely to be in order from a surfactant possible to be surfactant a, a surfactant possible to be surfactant AB, and a surfactant possible to be surfactant b. According to such estimation, the surface tensions of 0.1 mass % aqueous solution and 0.1 mass % mixture with a nitrogen-containing solvent can be measured before actually adding the surfactants. The molecular weights can be measured by a known method, such as gel permeation chromatography (GPC) or size exclusion chromatography (SEC). GPC is more beneficial.

Silicone surfactants modified with organic substances may be used because of easy molecular weight control and availability. Such modified silicone surfactants may be polyether-modified or polyester-modified silicones. In some embodiments, polyether-modified silicone surfactants may be used.

1. 5. Other Surfactants

In an embodiment, the ink and treatment liquid compositions may contain other surfactants, including silicone surfactants other than surfactants A and B. Surfactants other than silicone surfactants include acetylene glycol surfactants and fluorosurfactants.

Acetylene glycol surfactants include, but are not limited to, SURFYNOL (registered trademark) series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all produced by Evonik Industries); OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all produced by Nissin Chemical Industry); and ACETYLENOL series E00, E00P, E40, and E100 (all produced by Kawaken Fine Chemicals).

In an embodiment using a fluorosurfactant, fluorine-modified polymer, such as BYK-340 (produced by BYK), may be used.

The total surfactant content may be 0.05% to 5% relative to the total mass of the ink composition.

1. 6. Nitrogen-Containing Organic Solvent, Sulfur-Containing Solvent, and Cyclic Ester Either the ink or the treatment liquid contains at least one specific solvent selected from the group consisting of nitrogen-containing solvents, sulfur-containing solvents, and cyclic esters (lactones). These solvents can be a suitable solvent of the resin in the ink and help the ink form a coating film with a smooth surface on the printing medium and form rub-resistant printed items.

Those solvents are less evaporative than water. Accordingly, such a solvent in the ink and treatment liquid compositions applied onto the printing medium is more likely than water to remain on the printing medium. Thus, the specific solvent in the ink can dissolve the resin and other constituents of the ink and the resin contained in the printing medium, thus increasing rub resistance. Also, the specific solvent helps fully spread the mixture of the ink and the treatment liquid, either of which contains surfactant B.

The solvent is not limited to liquid by itself at room temperature and normal pressure and may be solid. Even if the solvent itself is solid at room temperature and normal pressure, it can be used as the solvent of the resin, provided that it is soluble in any other solvent or water and that its solution can act as a solvent of the resin. The solvent may have a normal boiling point of 170° C. to 310° C., for example, 180° C. to 300° C. or 200° C. to 270° C.

Nitrogen-containing solvents are organic compounds containing nitrogen in the molecule. Amide-based solvents, which contain an amide group, are an example of nitrogen-containing solvents and effective in increasing rub resistance. Amide-based solvents include cyclic amides (lactams) and acyclic amides. Adding a nitrogen-containing solvent to the ink or treatment liquid composition increases rub resistance and image quality and facilitates recovery from clogging. Cyclic amides facilitate recovery from clogging, whereas acyclic amides increase rub resistance.

Acyclic amides contain an acyclic amide group in the molecule. Acyclic amides used as the nitrogen-containing solvent includes compounds represented by the following formulas (1), (2), and (3):

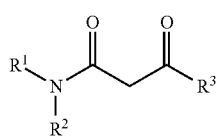
(1)

wherein $R^1$ and $R^2$ each independently represent one selected from the group consisting of a hydrogen atom and alkyl groups with 1 to 5 carbon atoms, and $R^3$ represents an alkyl group with 1 to 5 carbon atoms.

In some embodiments, at least either $R^1$ or $R^2$ in formula (1) is an alkyl group with 1 to 5 carbon atoms, and beneficially, both are alkyl groups with 1 to 5 carbon atoms. $R^1$, $R^2$, and $R^3$ can be alkyl with 1 to 4 carbon atoms, for example, alkyl with 1 to 3 or 1 or 2 carbon atoms.

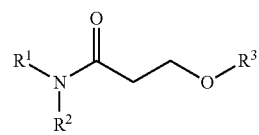
(2)

wherein $R^1$ and $R^2$ each independently represent one selected from the group consisting of a hydrogen atom and alkyl groups with 1 to 5 carbon atoms, and $R^3$ represents an alkyl group with 1 to 5 carbon atoms.

In some embodiments, at least either $R^1$ or $R^2$ in formula (2) is an alkyl group with 1 to 5 carbon atoms, and beneficially, both are alkyl groups with 1 to 5 carbon atoms. $R^1$, $R^2$, and $R^3$ can be alkyl with 1 to 4 carbon atoms, for example, alkyl with 1 to 3 or 1 or 2 carbon atoms. The number of carbon atoms may be 3 to 5.

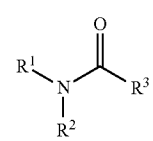
(3)

wherein $R^1$ and $R^2$ each independently represent one selected from the group consisting of a hydrogen atom and alkyl groups with 1 to 5 carbon atoms, and $R^3$ represents an alkyl group with 1 to 5 carbon atoms.

In some embodiments, at least either $R^1$ or $R^2$ in formula (3) is an alkyl group with 1 to 5 carbon atoms, and beneficially, both are alkyl groups with 1 to 5 carbon atoms. $R^1$, $R^2$, and $R^3$ can be alkyl with 1 to 4 carbon atoms, for example, alkyl with 1 to 3 or 1 or 2 carbon atoms. The number of carbon atoms may be 3 to 5.

Cyclic amides contain a cyclic amide group in the molecule. Cyclic amides used as the nitrogen-containing solvent include compounds represented by the following formula (4):

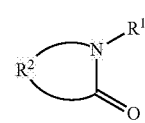
(4)

wherein $R^1$ represents a hydrogen atom, an alkyl or alkenyl group with 1 to 6 carbon atoms, and $R^2$ represents an alkylene group with 1 to 6 carbon atoms that is a part of the cyclic amide ring.

In some embodiments, $R^1$ in formula (4) may be a hydrogen atom or an alkyl group with 1 to 6 carbon atoms. The alkyl group may be a cycloalkyl group. In exemplary embodiments, $R^1$ is a hydrogen atom or an alkyl group with 1 to 3 carbon atoms and is, particularly, a hydrogen atom. $R^2$ may be an alkylene group with 3 to 5 carbon atoms, for example, an alkylene group with 3 or 4 carbon atoms.

The compounds represented by formula (4) are lactams. The lactams may be 3-membered to 8-membered rings. For example, pyrrolidones are 5-membered lactams.

Examples of the cyclic amides represented by formula (4) include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, ε-caprolactam, 1-cyclohexyl-2-pyrrolidone, 2-piperidone, N-methyl-ε-caprolactam, β-propiolactam, and ω-heptalactam.

Examples of the acyclic amides represented by formula (2) include alkoxyalkylamides, such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Other nitrogen-containing solvents include N,N-dimethylisobutyramide, N,N-dimethylacetamide, N-methylacetamide, 1-methyl-4-piperidone, 1,3-dimethylurea, 1,3-diethylurea, tetramethylurea, 1,3-dimethyl-2-imidazolidinone, N,N-dimethylpropyleneurea, 3-methyl-2-oxazolidinone, 2-oxazolidinone, and 1-(2-hydroxyethyl)-2-pyrrolidone.

Cyclic esters are solvents having a cyclic structure with an ester bond in the molecule. Cyclic esters include lactones, such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonanolactone, ε-nonalactone, and ε-decanolactone, and compounds formed by substituting an alkyl group with 1 to 4 carbon atoms for the hydrogen of the methylene group adjacent to the carbonyl group of such lactones; and cyclic carbonates, such as ethylene carbonate, propylene carbonate, and butylene carbonate. Lactones are stable in storage.

Sulfur-containing solvents contain a sulfur atom in the molecule. Sulfur-containing solvents include sulfones and sulfoxides. Sulfones includes cyclic sulfones and acyclic sulfones. Exemplary sulfur-containing solvents include dimethyl sulfoxide, dimethyl sulfone, ethyl methyl sulfone, diethyl sulfone, dipropyl sulfone, ethyl isopropyl sulfone, sulfolane, and 3-methylsulfolane. Exemplary sulfoxides include dimethyl sulfoxide diethyl sulfoxide, and tetramethylene sulfoxide.

The total content of the above-described specific solvents (at least one of nitrogen-containing solvents, sulfur-containing solvents, and cyclic esters) in the ink and treatment liquid compositions may be 1% by mass or more. Also, such a total specific solvent content may be 50% by mass or less. In some embodiments, the total specific solvent content may be, by mass, 3% to 30%, for example, 5% to 25% or 10% to 20%. In an embodiment, the ink composition contains one or more specific solvents from the viewpoint of increasing rub resistance and image quality. In some embodiments, both the ink and treatment liquid compositions contain one or more specific solvents from the viewpoint of further increasing rub resistance and image quality.

The proportion by mass of the total content of the nitrogen-containing and sulfur-containing solvents and cyclic esters may be 10% or more relative to the total organic solvent content of the composition. The upper limit is 100%. In some embodiments, the proportion by mass of the specific solvents to all the organic solvents in the compositions may be 30% to 90%, for example, 40% to 70% or 50% to 60%. When the proportion of the specific solvents is equal to or higher than the lower limit of such a range, the composition can form rub-resistant high-quality images. When the proportion of the specific solvents is lower than or equal to the upper limit of such a range, the composition can facilitate recovery from clogging. In the embodiments using organic solvents other than the nitrogen-containing and sulfur-containing solvents and cyclic esters, the total organic solvent content refers to all the organic solvent contents, including those other organic solvents.

1. 7. Other Organic Solvents

The ink and treatment liquid compositions may further contain organic solvents other than the nitrogen-containing and sulfur-containing solvents and cyclic esters. Further adding other organic solvents helps the ink and treatment liquid compositions retain moisture, reduces clogging, and facilitates recovery from clogging. Also, such organic solvents help the ink composition dry quickly on the printing medium, effective in forming rub-resistant high-quality images. In addition, the organic solvents tend to dissolve the resin, increasing the rub resistance of the printed item.

The organic solvents may be soluble in water. Water-soluble organic solvents help the ink dry more quickly, effective in forming rub-resistant high-quality images.

Examples of water-soluble organic solvents include, but are not limited to, alkanediols, polyols, esters, and glycol ethers.

An alkanediol whose alkane moiety has 5 or more carbon atoms may be used. The alkane moiety may be linear or branched and have 5 to 9 carbon atoms. Examples of the alkanediol include 1,2-pentanediol, 1,5-pentanediol, 1,2-hexanediol, 1,2-octanediol, and 1,6-hexanediol. 1,2-Alkanediols are exemplary.

Alkanediols may be used individually or in combination. Alkanediols can increase the wettability of the ink composition on the printing medium and help the ink composition permeate the printing medium. In particular, 1,2-alkanediols are useful as a permeation enhancer. The alkanediol content of the ink composition may be, by mass, 1% to 20%, for example, 1.5% to 15% or 2% to 10%.

Examples of polyols include ethylene glycol, propylene glycol, 1,3-propanediol, 1,2-butanediol, 1,3-butanediol, 1,4-butanediol, diethylene glycol, triethylene glycol, dipropylene glycol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin. Such polyols may be used individually or in combination. Polyols are useful as a moisturizing agent. The polyol used in the ink or the treatment liquid may be a compound formed by substituting two or more hydroxy groups for hydrogens of an alkane with four or fewer carbon atoms, or a compound formed by condensing hydroxy groups of alkane molecules substituted with two or more hydroxy groups. The number of condensations may be 2 to 4. Polyols are compound having two or more hydroxy groups in the molecule. In some embodiments of the present disclosure, the number of hydroxy groups is 2 or 3. The polyol content in the ink composition may be, by mass, 1% to 30%, for example, 2% to 20% or 5% to 15%.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

The glycol ether that can be added to the ink composition may be an alkylene glycol monoether or an alkylene glycol diether. In some embodiments, alkylene glycol alkyl ethers may be used. More specifically, examples of glycol ethers include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. Such glycol ethers are effective in controlling the wettability of the ink composition on the printing medium.

Glycol diethers are more likely than glycol monoethers to dissolve or swell the resin in the ink and increase the rub resistance of the printed image. The glycol ether content of the ink composition may be, by mass, 1% to 30%, for example, 2% to 20% or 3% to 10%.

The organic solvent content, other than the above-described specific solvents, may be 1% by mass or more relative to the total mass of the ink composition. Also, it may be 50% by mass or less. In some embodiments, the organic solvent content may be, by mass, 5% to 40%, for example, 10% to 35%. Such an organic solvent content of the ink composition is effective in facilitating recovery from clogging and increasing rub resistance.

The normal boiling point of the organic solvent further added to the ink composition may be 180° C. or more, for example, 200° C. or more or 210° C. or more. Also, the normal boiling point of the organic solvent may be 310° C. or less, for example, 300° C. or less, 280° C. or less, 270° C. or less, or 250° C. or less. The ink composition containing organic solvents having such a normal boiling point is unlikely to cause clogging and can form rub-resistant images.

Polyols having normal boiling points of more than 280° C., such as triethylene glycol and glycerin, act as a moisturizing agent and can reduce the likelihood that the ink jet head dries, thus beneficial in terms of anticlogging. However, polyols having normal boiling points of more than 280° C. can absorb water in the ink composition, increasing the viscosity of the ink composition at the ink jet head, reducing the dryability of the ink composition on the printing medium. Accordingly, in the ink composition disclosed herein, the proportion of polyols having normal boiling points of more than 280° C. may be 3.0% or less, for example, 2.0% or less, 1.0% or less, 0.8% or less, to the total mass of the ink composition. In some embodiments, the proportion of such polyols may be 0.1% or less. In this instance, the ink composition can dry rapidly on the printing medium and is accordingly suitable for forming rub-resistant images on absorption-resistant printing media. From the viewpoint of forming rub-resistant images, the content of organic solvents with normal boiling points of more than 280° C., including polyols, may be controlled in a range as described above.

1. 8. Coloring Material

The ink composition disclosed herein contains a coloring material. The ink composition can be a coloring ink.

The coloring material may be a dye or a pigment. Pigments are resistant to fading caused by light or gases and are accordingly beneficial. Images formed with a pigment on a printing medium can have high image quality and be resistant to water, gases, and light, being stable in storage. Such features of pigments are apparent particularly when forming images on absorption-resistant printing media, such as poorly ink-absorbent printing media and non-ink-absorbent printing media.

The pigment used in the ink may be an inorganic pigment or an organic pigment but is not particularly limited. Example of the inorganic pigment include titanium oxide, iron oxide, and carbon blacks produced by known methods, such as the contact method, the furnace method, and the thermal method. Examples of the organic pigment include azo pigments, polycyclic pigments, nitro pigments, nitroso pigments, and aniline black. Azo pigments include azo lake, insoluble azo pigments, condensed azo pigments, and chelate azo pigments. Polycyclic pigments include phthalocyanine pigments, perylene pigments, perinone pigments, anthraquinone pigments, and quinophthalone pigments.

The pigment used in black inks may be a carbon black. Examples of the carbon black include, but are not limited to, C.I. Pigment Black 7, such as furnace black, lampblack, acetylene black, and channel black; and commercially available carbon blacks, such as No. 2300, 900, MCF88, No. 20B, No. 33, No. 40, No. 45, No. 52, MA7, MA8, MA77, MA100, and No. 2200B (all produced by Mitsubishi Chemical); Color Blacks FWI, FW2, FW2V, FW18, FW200, S150, S160, and S170, Printex 35, Printex U, Printex V, Printex 140U, and Special Blacks 6, 5, 4A, 4, and 250 (all produced by Degussa); and Conductex SC, Raven 1255, Raven 5750, Raven 5250, Raven 5000, Raven 3500, and Raven 700 (all produced by Carbon Columbia); and Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12 (all produced by Cabot).

Examples of pigments that can be used in white inks include, but are not limited to, C.I. Pigment Whites 6, 18, and 21 and other inorganic white pigments, such as, titanium oxide, zinc oxide, zinc sulfide, antimony oxide, magnesium oxide, and zirconium oxide. Also, organic white pigments, such as white hollow resin particles and polymer particles, may be used apart from inorganic white pigments.

Examples of pigments that can be used in yellow inks include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments that can be used in magenta inks include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

Examples of pigment that can be used in cyan inks include, but are not limited to, C.I. Pigment Blues 1, 2, 3, 15, 15:1, 15:2, 15:3, 15:34, 15:4, 16, 18, 22, 25, 60, 65, and 66; and C.I. Vat Blues 4 and 60.

Pigments that can be used in color inks other than magenta, cyan, and yellow inks include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

Pearl pigments may also be used, and examples thereof include, but are not limited to, pigments exhibiting pearly gloss or interference gloss, such as titanium dioxide-coated mica, fish scale foil, and bismuth oxychloride.

Metallic pigments may also be used, and examples thereof include, but are not limited to, elemental metals, such as aluminum, silver, gold, platinum, nickel, chromium, tin, zinc, indium, titanium, and copper, and alloys such elemental metals.

The lower limit of the coloring material content in the ink composition may be 0.5% or more, for example, 1% or 3%, relative to the total mass of the ink composition. Also, the upper limit of the coloring material content in the ink composition may be 20% or less, for example, 10%, 7%, or 6%, relative to the total mass of the ink composition. Such a coloring material content of the ink composition is suitable for forming images resistant to water, gases, light, and the like on the printing medium and keeping the ink composition stable in storage.

When a pigment is used as the coloring material, the pigment may be in the form of a dispersion liquid. For dispersing the pigment, a dispersant may be used to impart dispersibility to the pigment particles. The pigment dispersion liquid may contain a solvent in addition to the pigment and the dispersant. The solvent may be water or a hydrophilic solvent, such as diethylene glycol. The dispersant may be a styrene-acrylic acid copolymer. The acid value of the dispersant may be, but is not limited to, 20 mg KOH/g or more from the viewpoint of uniformly dispersing the pigment.

1. 9. Resin

The ink composition disclosed herein may contain a resin. The resin solidifies the ink composition and firmly fixes the solidified ink to the printing medium. The resin may be dissolved or dispersed in the ink composition. The resin dispersed in the ink is obtained by preparing an emulsion or suspension of a resin poorly soluble or insoluble in the liquid medium of the ink and adding the emulsion or suspension to the ink. The resin used herein may be referred to as resin particles. In some embodiments, the resin may be in dispersion from the viewpoint of increasing rub resistance.

Examples of the resin used in the ink composition include, but are not limited to, acrylic resin, vinyl acetate resin, polyvinyl chloride resin, butadiene resin, styrene resin, polyester resin, crosslinked acrylic resin, crosslinked styrene resin, benzoguanamine resin, phenol resin, silicone resin, epoxy resin, urethane resin, paraffin resin, fluororesin, and water-soluble resin. The resin may be a copolymer that is a combination of monomers forming these resins. Examples of the copolymer include, but are not limited to, styrene-butadiene resin and styrene-acrylic resin. A polymer latex containing such a resin may be used as the resin. For example, a polymer latex containing fine particles of a resin, such as acrylic resin, styrene-acrylic resin, styrene resin, crosslinked acrylic resin, or crosslinked styrene resin, may be used. The resin may be an individual one or a combination of two or more resins.

An acrylic resin is a homopolymer or a copolymer formed by polymerization using at least an acrylic monomer. Acrylic monomers include (meth)acrylates, (meth)acrylic acid, acrylamide, and acrylonitrile. The acrylic resins in a copolymer form may be acrylic-vinyl resin formed by using a vinyl monomer as the other monomer, for example, a styrene-acrylic resin formed by using styrene as the vinyl monomer. Acrylic resin, urethane resin, and polyester resin are more available than other resins and beneficial in obtaining a resin having desired properties.

The lower limit of the resin solid content may be 1% or more, for example, 2% or 3%, relative to the total mass of the ink composition. The upper limit of the resin solid content may be 15% or less, for example, 10% or 7%, relative to the total mass of the ink composition. Such a resin content is effective in reducing clogging during printing and forming rub-resistant images on absorption-resistant printing media.

1. 10. Wax

The ink composition disclosed herein may contain a wax. The wax may be dissolved in the ink composition or may be in dispersion prepared by dispersing fine particles of a wax emulsion. The wax tends to increase the rub resistance of the printed item. In particular, the wax is likely to be distributed at the surface of the ink coating, that is, at the interface between the air and the coating, on the printing medium, thus contributing to increasing the rub resistance. The wax may be, but is not limited to, an ester wax made up of a higher fatty acid and a higher monohydric or dihydric alcohol, a paraffin wax, a microcrystalline wax, a polyolefin wax, or a mixture of such waxes.

The polyolefin wax may be a wax produced from an olefin, such as ethylene, propylene, butylene, or an olefin derivative, or a copolymer of such waxes. More specifically, the polyolefin wax may be a polyethylene wax, a polypropylene wax, or a polybutylene wax. A commercially available polyolefin wax may be used, and examples thereof include NOPCOTE PEM 17 (produced by San Nopco), CHEMIPEARL W4005 (produced by Mitsui Chemicals), and AQUACER 515 and AQUACER 593 (both produced by BYK).

The wax content of the ink composition may be 0.1% to 5%, for example, 0.2% to 4% or 0.3% to 3%, relative to the total mass of the ink composition. Such a wax content is effective in increasing rub resistance and reducing the viscosity of the ink composition, contributing to consistent ink ejection and recovery from clogging.

1. 11. Antifoaming Agent

The ink compositions may contain an antifoaming agent, and examples thereof include, but are not limited to, silicone antifoaming agents, polyether antifoaming agents, fatty acid ester antifoaming agents, and acetylene glycol antifoaming agents. The antifoaming agent is commercially available, and examples thereof include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (all produced by BYK Additives & Instruments); and SURFYNOL series DF37, DF110D, DF58, DF75, DF220, MD-20, and ENVIRO GEM AD01 (all produced by Evonik Industries). Such antifoaming agents may be used individually or in combination.

The antifoaming agent content of the ink composition may be 0.03% to 0.7%, for example, 0.05% to 0.5% or 0.08% to 0.3%, relative to the total mass of the ink composition.

1. 12. Other Constituents

The ink composition disclosed herein may optionally contain a solubilizing agent, a viscosity modifier, a pH adjuster, an antioxidant, a preservative, an antifungal agent, a corrosion inhibitor, a moisturizing agent that does not act as the above-described organic solvents, and a chelating agent for capturing metal ions affecting dispersion, and other additives, from the viewpoint of maintaining storage stability and consistency of ejection from the ink jet head and reducing clogging and ink deterioration.

1. 13. Preparation of Ink Composition

The ink composition disclosed herein is prepared by mixing the above-described constituents in a desired order and, optionally, removing impurities by, for example, filtration. For mixing, the constituents may be added one after another into a container equipped with a stirring device, such as a mechanical stirrer or a magnetic stirrer, followed by stirring. Filtration may be performed as required by, for example, centrifugal filtration or using a filter.

2. TREATMENT LIQUID COMPOSITION

The treatment liquid composition (often referred herein to as the treatment liquid) of the ink set disclosed herein will now be described. The treatment liquid composition, as well as the ink composition, constitutes the ink set disclosed herein. The treatment liquid is a water-based composition. As with the above-described ink, the treatment liquid is ejected by an ink jet method, thus used for printing on printing media.

The treatment liquid composition used herein flocculates one or more constituents of the ink composition and contains a flocculant capable of flocculating the constituents. The treatment liquid reacts with the coloring material, the resin, or the like in the ink composition. The coloring material content in the treatment liquid may be, by mass, 0.2% or less, for example, 0.1% or less or 0.05% or less. The lower limit of the coloring material content is 0%. Unlike the ink composition, the treatment liquid is not an ink used for coloring the printing medium and is an aid applied onto the printing medium before or simultaneously with applying the ink.

The treatment liquid contains a flocculant and a surfactant. The constituents of the treatment liquid, including their contents and properties, may be the same as those of the ink composition, except for the coloring material. However, such constituents can be selected independently of the ink composition. The treatment liquid is beneficial for printing high-quality images. However, the treatment liquid can reduce rub resistance and adversely affect recovery from clogging.

2. 1. Flocculant

The treatment liquid used herein contains a flocculant capable of flocculating one or more components of the ink composition. The flocculant in the treatment liquid reacts rapidly with the coloring material, the resin, and the like in the ink composition in the ink application step described later herein. Thus, the coloring material and resin dispersed in the ink composition are flocculated. The flocculant inhibits the coloring material from moving on the printing medium, thus improving the image quality of the printed image.

The flocculant may be a multivalent metal salt, a cationic compound, such as a cationic polymer or a cationic surfactant, or an organic acid. A flocculant may be used individually, or some flocculants may be used in combination. In some embodiments, the flocculant may be at least one selected from the group consisting of multivalent metal salts, organic acids, and cationic polymers. These flocculants are highly reactive with the constituents in the ink composition.

The multivalent metal salt may be a water-soluble compound composed of a divalent or higher-valent metal ion and an anion capable of binding to the metal ion. Examples of the multivalent metal ion include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $Fe^{3+}$, and $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Calcium salts and magnesium salts are beneficial as the flocculant in terms of stability of the treatment liquid and reactivity of the treatment liquid.

Examples of the organic acid include phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridinecarboxylic acid, coumaric acid, thiophenecarboxylic acid, and nicotinic acid. Derivatives and salts of these acids can be used as the flocculant. Such organic acids may be used individually or in combination. Organic acid salts of polyvalent metals belong to the category of the above-described polyvalent metal salts.

Examples of the cationic polymer include cationic urethane resin, cationic olefin resin, cationic amine-based resin, and cationic amide-based resin. The cationic amine-based resin contains the amino group, and examples thereof include allylamine resin, polyamine resin, and quaternary ammonium salt polymer. The polyamine resin may be a resin having the amino group in the main skeleton of the resin. The allylamine resin may have a structure derived from the allyl group in the main skeleton of the resin. The quaternary ammonium salt polymer may be a resin having a quaternary ammonium salt in the structure thereof. In some embodiments, a cationic amine-based resin may be used. Cationic amine-based resins are more reactive and available than other cationic polymers.

The flocculant content of the treatment liquid may be 0.5% or more, for example, 1% or more or 3% or more, relative to the total mass of the treatment liquid. Also, the flocculant content of the treatment liquid may be 20% or less, for example, 15% or less or 10% or less, relative to the total mass of the treatment liquid.

2. 2. Surfactant

The treatment liquid used herein contains a surfactant. The surfactant reduces the surface tension of the treatment liquid to increase the wettability of the treatment liquid on the printing medium. The surfactant in the treatment liquid includes the above-described surfactant A. Aldo, either the surfactant in the ink composition or the surfactant in the treatment liquid includes Surfactant B. The surfactant includes other surfactants. The types, features, and examples of the surfactant are the same as those of the surfactant described for the ink composition.

2. 3. Organic Solvent

The treatment liquid may contain an organic solvent. The organic solvent increases the wettability of the treatment liquid on the printing medium. Either the ink composition or the treatment liquid contains a specific solvent selected from a nitrogen-containing solvent, a sulfur-containing solvent, and a cyclic ester. In some embodiments, the treatment liquid contains such a solvent. The types, features, and examples of the organic solvent are the same as those of the organic solvent described for the ink composition.

2. 4. Other Constituents

The treatment liquid used herein may optionally contain a pH adjuster, a preservative or fungicide, a rust preventive, a chelating agent, and other additives, as with the above-described ink composition.

2. 5. Preparation of Treatment Liquid

The treatment liquid used herein may be prepared by mixing and dispersing the above-described constituents in an appropriate manner. After sufficiently stirring the mixture, foreign matter and coarse particles, which may cause clogging, are removed through a filter to yield a desired treatment liquid.

3. INK SET

The ink set disclosed herein includes the above-described ink composition and treatment liquid composition. The number of ink compositions may be one or two or more. In the embodiments of the ink set including two or more ink compositions, at least one of the ink compositions is the above-described ink composition. The same applied to the treatment liquid. The ink set is used for printing. The ink and treatment liquid of the ink set may be contained in their respective containers. The containers may be integrated or separate. The containers may be bottles, bags, or cartridges.

4. PRINTING METHOD

The printing method disclosed herein is used for printing with the above-described ink set. The printing method includes applying the above-described ink composition onto a printing medium by an ink jet method, and applying the above-described treatment liquid onto the printing medium by an ink jet method. The printing method may be conducted in a serial printing manner, or in a line printing manner with a line head disposed across the width of the printing medium. Line printing prints one entire line of an image in one scan.

The following embodiment of the printing method disclosed herein describes a serial printing method using an ink jet printing apparatus including an ink jet head.

In the serial printing method, the number of main scans refers to the number of passes of the nozzles used for printing with a composition. Individual passes are such that the nozzles at a position opposing the printing medium pass across the printing medium. For example, for printing with a nozzle group or line of the nozzles illustrated in FIG. 3, filled with an ink, when the distance advancing in one sub-scan is equal to half the length in the sub-scanning direction of the nozzle group, the number of main scans is two. The number of main scans can be increased by reducing the advancing distance of one sub-scan and can be reduced by increasing the advancing distance. When the number of main scans is increased, the total amount of composition applied can be increased, and a certain amount of composition can be applied through a plurality of main scans. In contrast, when the number of main scans is reduced, the printing speed ca be reduced. The number of main scans may be referred to as the number of passes. In the present disclosure, the number of main scans is the number of scans when the nozzle group is considered to be an ejection nozzle group that is actually used for printing. The number of main scans is at least one and may be 2 to 25, for example, 3 to 20 or 4 to 16.

The printing method may be conducted in a line printing manner. Line printing uses a line head disposed across the width of the printing medium and prints one entire line of an image in one scan.

In the disclosed embodiments, the ink jet printing method includes an ink and a treatment liquid application step performed in main scans and optionally a secondary heating step.

4. 1. Treatment Liquid Application Step

In the treatment liquid application step, the treatment liquid capable of reacting with the ink composition is applied onto the printing medium. Applying the treatment liquid onto the printing medium increases the rub resistance and image quality of the printed image.

The treatment liquid may be or may not be applied simultaneously with the ink composition. The word "simultaneously" implies that the ink composition and the treatment liquid are applied to a predetermined region of the printing medium in the same main scan. In contrast, "not simultaneously" implies that the ink application to a region of the printing medium and the treatment liquid application to the region are performed in their respective main scans.

When the ink and the treatment liquid are not applied simultaneously, the treatment liquid may be applied to a region in a main scan, followed by applying the ink composition to the region in another main scan, or the ink composition may be applied to a region in a main scan, followed by applying the treatment liquid to the region by another main scan.

Simultaneous application of the ink and the treatment liquid means that the two compositions are applied to a predetermined region of the printing medium in the same scan. The predetermined region may be, for example, a band extending in the main scanning direction with a width in the sub-scanning direction. More specifically, when a group of ink ejection nozzles and a group of treatment liquid ejection nozzles are projected in a direction parallel to the main scanning axis, the projected images have a coincident portion parallel to the sub-scanning axis.

When the treatment liquid application step is performed simultaneously with the ink application step, droplets of the treatment liquid and droplets of the ink are likely to contact each other in a substantially wet condition on the printing medium and react with each other, thus forming high-quality images. Also, the treatment liquid components and the ink components mix easily, and a constituent in one composition helps the other spread. Thus, both compositions can spread favorably. In contrast, when the treatment liquid and ink compositions are not simultaneously applied, clogging can be readily resolved.

In the embodiment using the nozzle arrangement depicted in FIG. 3, the treatment liquid application step is performed simultaneously with the ink application step described later herein. In the embodiment using the nozzle arrangement depicted in FIG. 4, the treatment liquid application step is performed before the ink application step. The ink application step follows the treatment liquid application.

The mass of a droplet of each composition (the ink composition and the treatment liquid) may be 1 ng or more and 30 ng or less. In some embodiments, the mass of a droplet may be 4 ng or more, for example, 10 ng or more or 14 ng or more, and may be 25 ng or less, for example, 20 ng or less or 18 ng or less. When the mass of a droplet is in such a range, high-quality images can be formed.

In the printing method disclosed herein, the amount per unit area of the treatment liquid applied to the region of the printing medium where the ink composition and the treatment liquid are applied one on top of the other may be 5% or more to the mass of the ink composition. Also, it may be 50% by mass or less. In some embodiments, the proportion of the treatment liquid applied to that region is, by mass, 10% or more, for example, 15% or more or 20% or more, and 40% or less or 35% or less, relative to the ink composition. In an exemplary embodiment, it may be 30% or less, for example, 25% or less or 20% or less. The amount of the treatment liquid applied may be that in the region to which the largest amount of the ink composition is applied. Applying the treatment liquid in such a proportion can produce higher image quality and prevent a decrease in the rub resistance of the printed image.

The print density of the ink and the treatment liquid compositions may be 300 dpi×300 dpi or more, for example, 600 dpi×600 dpi or more or 720 dpi×720 dpi or more. Applying the treatment liquid in the above-described proportion at such a density regulates the spread of the ink and treatment liquid composition, thus forming more high-quality images, preventing a decrease in the rub resistance of the printed image. The upper limit of the print density may be 10000 dpi×10000 dpi or less.

The treatment liquid and ink application steps may include primary drying. Primary drying heats the printing medium before the application steps with a heating mechanism such as a preheater 7 depicted in FIG. 1, or during the application steps with a heating mechanism depicted in FIG. 1. Thus, the ink and treatment liquid compositions are applied onto the heated printing medium. Consequently, the solvents, particularly water, in the treatment liquid and ink compositions evaporate quickly when the compositions have reached the printing medium, reducing the fluidity of the composition to reduce unevenness in the image and maintain image quality. Also, the compositions thus heated spread readily on the printing medium to form uniform coatings of the ink and treatment liquid compositions. Consequently, the treatment liquid can react sufficiently with the ink composition to provide favorable image quality.

The ink and treatment liquid compositions may be applied onto the printing medium with a surface temperature of 50° C. or less and 20° C. or more. In some embodiments, the printing medium surface temperature during application is 28° C. to 45° C., for example, 32° C. to 43° C. or 35° C. to 40° C. When the ink and treatment liquid compositions are applied onto the printing medium with such a surface temperature, the treatment liquid can form uniform coating films on the printing medium 10, increasing rub resistance and image quality. Also, heat impact on the ink jet head is reduced. The surface temperature of the printing medium can be set independently between the ink composition and the treatment liquid. The surface temperature to be set is the highest temperature during printing. In the embodiments including the primary drying, the surface temperature is the temperature of the printing medium undergoing heat for drying. This surface temperature is the temperature of the portion of the printing medium opposite the ink jet head. The surface temperature can be measured with a thermocouple or a non-contact type thermometer.

In the ink and treatment liquid application steps, the temperatures of the ink and treatment liquid compositions to be ejected may be 45° C. or less and 20° C. or more. In some embodiments, the temperature of the compositions to be applied is 25° C. to 42° C., for example, 28° C. to 40° C. or 32° C. to 38° C. Ejecting the compositions with such a temperature produces high-quality images and facilitating recovery from clogging. The temperature of the compositions to be ejected is the highest temperature during printing.

The temperature of the nozzle face of the ink jet head when the compositions are ejected may be considered the temperature of the compositions to be ejected. The temperature of the compositions immediately before ejecting the compositions is substantially the same as the temperature of the nozzle face. The nozzle face temperature may be increased by the heat generated from the ink jet head or the like or the heat of the above-described heating step. The temperature can be measured with a thermocouple or the like.

By controlling the nozzle face temperature in any of the above ranges, heat impact on the ink jet head is reduced, thus preventing the ink jet head or nozzles from being clogged.

In some embodiments, the surface temperature of the printing medium 10 to which the ink and treatment liquid compositions are applied is equal to or higher than the temperatures of the compositions to be ejected and may be higher by 5° C. or less or 2° C. to 4° C. Such temperature control produces high-quality images and facilitates recovery from clogging.

4. 2. Ink Application Step

In the ink application step, the above-described ink composition is ejected onto the printing medium from an ink jet head to form an image on the surface of the printing medium. The ink application step can be performed in the same manner under the same conditions as the treatment liquid application step.

The maximum of the application amount per unit area (application rate) of the ink composition to the printing medium may be 5 mg/inch$^2$ or more, for example, 7 mg/inch$^2$ or more or 10 mg/inch$^2$ or more. The upper limit of the application rate of the ink composition may be, but is not limited to, 25 mg/inch$^2$ or less, for example, 20 mg/inch$^2$, 18 mg/inch$^2$, or 16 mg/inch$^2$. The maximum application rate of the ink composition is the total mass per unit area of the ink compositions applied to an area one on another. The amount of the ink composition applied to the printing medium may be larger than the treatment liquid.

4. 3. Secondary Heating Step

The ink jet printing method disclosed herein may optionally include a secondary heating step (may be referred to as post-application heating step) of heating the printing medium with, for example, the secondary heater 5 depicted in FIG. 1 after the ink and treatment liquid application steps. Thus, the resin or the like in the ink composition on the printing medium is melted to form an ink film and solidified to be firmly fixed to the printing medium, forming a rub-resistant high-quality image.

The upper limit of the surface temperature of the printing medium 10 heated by the secondary heater 5 may be 120° C. or less, for example, 110° C. or 100° C. Also, the lower limit of the surface temperature of the printing medium 10 at this time may be 60° C. or more, for example, 70° C. or 80° C. Controlling the surface temperature in such a range ensures ink film formation, helping form rub-resistant high-quality images quickly. The surface temperature in the secondary heating step is the highest temperature of the portion of the printing medium that receives heat from the secondary heater during printing.

After the secondary heating step, the ink composition on the printing medium 10 may be cooled with a cooling fan 6 depicted in FIG. 1.

4. 4. Other Steps

The printing method disclosed herein may include a circulation or cleaning step of circulating or discharging the ink and treatment liquid compositions with a mechanism other than a pressure generator configured to eject the compositions for printing, that is, other than the ink ejection mechanism of the ink jet head.

The ink ejection mechanism of the ink jet head may be a piezoelectric element or a heater element that is operable to apply a pressure to the ink and is disposed in a pressure generating chamber (not shown). The cleaning step may be performed by applying an external pressure to the ink jet head 2 to discharge the ink and treatment liquid compositions from the nozzles. This cleaning step reduces the risk that the resin melts and adheres to the inner wall of the ink jet head 2, thus helping consistent ejection.

In an embodiment, the ink ejection mechanism may be configured to apply a pressure, for example, a negative pressure by suction or a positive pressure from an upstream position of the ink jet head. The discharge of the compositions is not flushing, which is a function of the ink jet head itself. Hence, the discharge is not the operation performed by using a function to eject ink from the ink jet head.

5. PRINTING APPARATUS 5. 1. Ink Jet Printing Apparatus

A printing apparatus used in the printing method disclosed herein will now be described with reference to the drawings.

Figure 2:
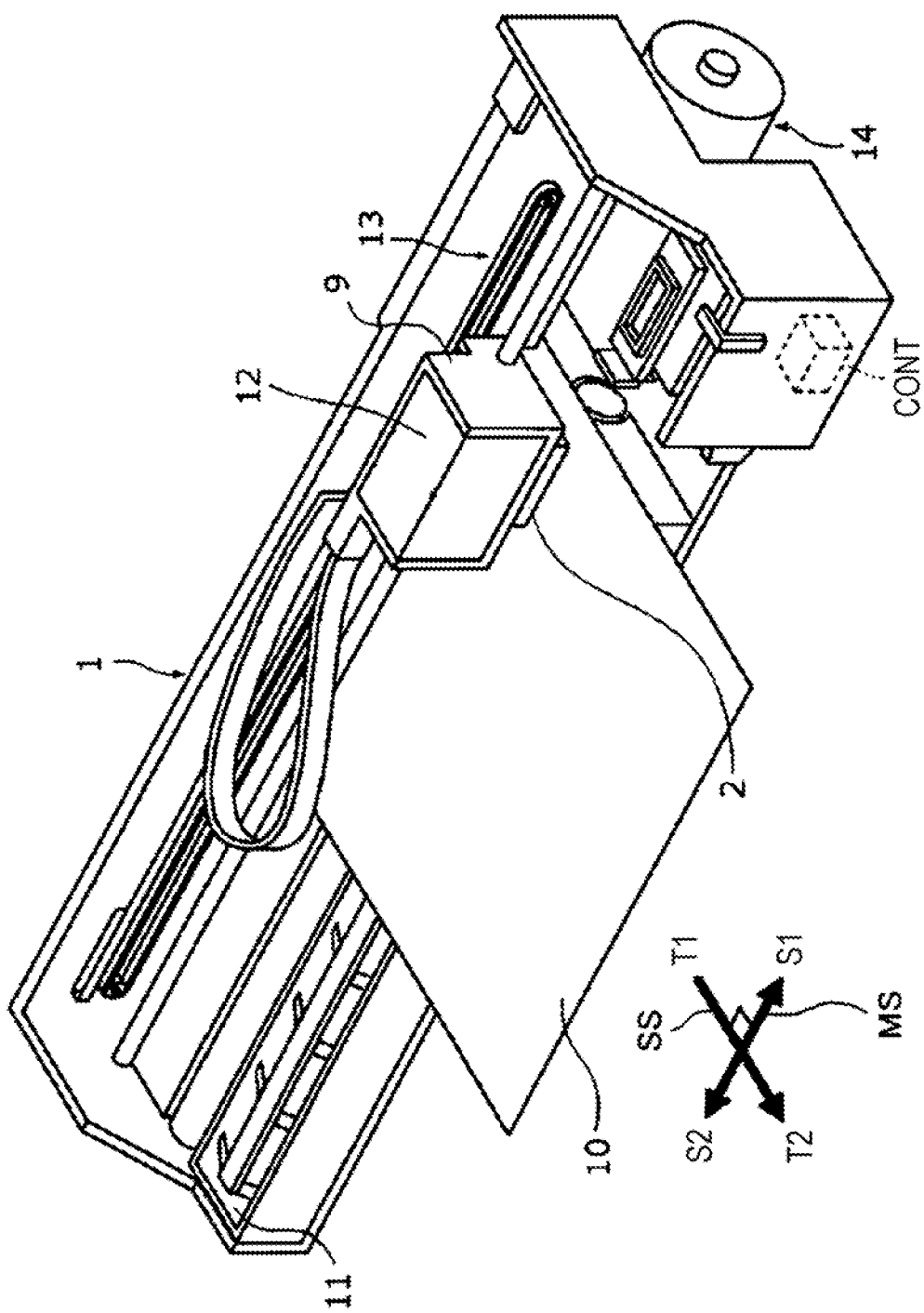
FIG. 2 is a perspective view illustrating a configuration of the carriage and its vicinity of the ink jet printing apparatus depicted in FIG. 1.

FIG. 1 is a schematic sectional view of an ink jet printing apparatus 1. FIG. 2 is a perspective view illustrating an exemplary configuration of the carriage and its vicinity of the ink jet printing apparatus 1 depicted in FIG. 1. As depicted in FIGS. 1 and 2, the ink jet printing apparatus 1 includes an ink jet head 2, an IR heater 3, a platen heater 4, a secondary heater 5, a cooling fan 6, a preheater 7, a blowing fan 8, a carriage 9, a platen 11, a carriage transfer mechanism 13, a medium transport device 14, and a control unit CONT. The general operation of the ink jet printing apparatus 1 is controlled by the control unit CONT depicted in FIG. 2.

The ink jet head 2 is a device configured to eject the ink composition and the treatment liquid composition capable of flocculating one or more constituents of the ink composition through nozzles (not depicted) onto an absorption-resistant printing medium 10 for printing on the medium. In the illustrated embodiment, the ink jet head 2 is of serial printing type that applies the ink and treatment liquid compositions onto the printing medium 10 while scanning (passing across) the printing medium 10 a plurality of times along a main scanning axis.

The ink jet head 2 is mounted on or in the carriage 9 depicted in FIG. 2. The ink jet head 2 passes across the width of the printing medium 10 along a main scanning axis a plurality of times as a result of the operation of the carriage transfer mechanism 13 that transfers the carriage 9 in the width direction of the printing medium 10. A pass of the ink jet head 2 along the main scanning axis is referred to as a main scan.

The term main scanning axis used herein is an axis extending in the directions designated by arrows MS in FIG. 2. A plurality of passes, or scans, along the main scanning axis imply that the ink jet head 2 moves in both directions from S1 to S2 and from S2 to S1 along the main scanning axis MS. Hence, the directions from S1 to S2 and S2 to S1 in which the carriage 9 equipped with the ink jet head 2 moves are also referred to as the main scanning directions. The main scanning directions are the directions in which the carriage 9 equipped with the ink jet head 2 moves.

An axis intersecting the main scanning axes is referred to as the sub-scanning axis, which is designated by arrow SS in FIG. 2. Hence, the transport direction of the printing medium 10, that is, the T1→T2 direction, is the sub-scanning direction SS. The ink jet head 2 passes across the printing medium once in a main scanning direction toward either the right or the left of the ink jet printing apparatus 1 in one scan. Alternately repeating such main scans with the ink jet head 2 and sub-scans for transporting the printing medium 10 prints the printing medium 10.

Ejection from the ink jet head 2 may be performed by a known technique. In the illustrated embodiment, vibration of piezoelectric elements, that is, mechanical deformation of electrostrictive elements, is used for ejection.

The ink jet printing apparatus 1 includes the IR heater 3, the platen heater 4, and the blowing fan 8 that heat the printing medium 10 for primary heating or drying when the ink and treatment liquid compositions are ejected from the ink jet head 2. In an embodiment, for heating the printing medium 10 in the ink application step, at least one of the IR heater 3, the platen heater 4, and the blowing fan 4 is used.

The IR heater 3 heats the printing medium 10 from the side on which the ink jet head 2 is located. In this instance, the ink jet head 2 is likely to be heated simultaneously with the printing medium 10. However, the IR heater 3 can more efficiently heat the printing medium without the interference of the thickness of the printing medium 10, compared to the platen heater 4 or the like that heats the printing medium 10 from the rear side. The platen heater 4 heats the printing medium 10 from the opposite side to the ink jet head 2. In this instance, the ink jet head 2 is less likely to be heated. The blowing fan 8 helps ink components evaporate, promoting drying. The blowing fan 8 may blow warm air or room-temperature air. Either can promote the evaporation of ink components. The IR heater 3, the platen heater 4, and the blowing fan 8 are examples of the heating mechanism.

The secondary heater 5 dries and solidifies the ink and treatment liquid compositions on the printing medium 10, functioning as an auxiliary heater or dryer. Heating the image printed on the printing medium 10 with the secondary heater 5 rapidly evaporates water and the like from the ink and treatment liquid compositions to allow the resin in the ink composition to form an ink film. The ink film is firmly fixed or adheres to the printing medium 10, thus forming a high-quality image quickly.

The illustrated ink jet printing apparatus 1 includes the cooling fan 6. By cooling the ink on the printing medium 10 with the cooling fan 6 after drying, the ink can form an ink coating film on the printing medium 10 with a high adhesion.

The illustrated ink jet printing apparatus 1 also includes the preheater 7 operable to heat the printing medium 10 before applying the ink and treatment liquid compositions onto the printing medium 10. Furthermore, the ink jet printing apparatus 1 may include a blowing fan 8 that efficiently dry the ink and treatment liquid compositions on the printing medium 10.

Below the carriage 9 are disposed the platen 11 over which the printing medium 10 is transported, the carriage transfer mechanism 13 operable to transfer the carriage 9 relative to the printing medium 10, and the medium transport device 14 that is a roller operable to transport the printing medium 10 in the sub-scanning direction. The carriage transfer mechanism 13 is configured to move the ink jet head 2 in the main scanning directions for scanning. The control unit CONT controls the operations of the carriage transfer mechanism 13 and the medium transport device 14.

The printing apparatus may further include a cleaning mechanism (not depicted) for the above-described cleaning step. Also, a wiping mechanism may be provided for wiping the nozzle face 2a of the ink jet head 2 to remove the compositions attached to the nozzle face 2a.

5. 2. Ink Jet Head

The ink jet head 2 ejects the ink composition and the treatment liquid onto the printing medium 10 while the carriage 9 moves to transfer the ink jet head 2 in the main scanning directions. The ink jet head 2 thus prints the printing medium 10 by a plurality of scans in the main scanning directions.

In the embodiment disclosed herein, the cartridge 12 operable to feed the ink and treatment liquid compositions to the ink jet head 2 includes a plurality of cartridges independent of each other. The cartridge 12 is, therefore, hereinafter referred to as the cartridge set 12. The cartridge set 12 is removably mounted on or in the carriage 9 equipped with the ink jet head 2. The cartridges of the cartridge set 12 contain different compositions, and from which the respective compositions are delivered to the nozzles. Although the embodiment disclosed herein illustrates the cartridge set 12 mounted on the carriage 9, the cartridges of an embodiment may be disposed at a position other than the carriage 9 so that the compositions can be delivered to the nozzles through feed tubes (not depicted).

Figure 3:
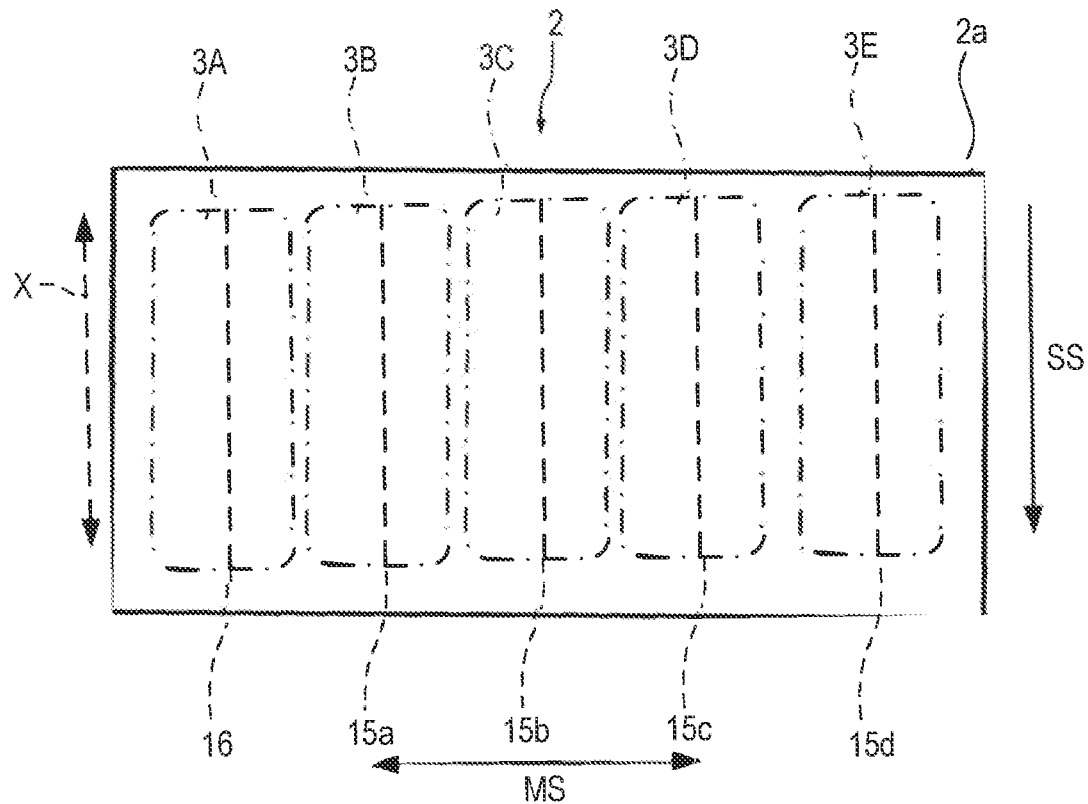
FIG. 3 is a schematic top view illustrating a nozzle arrangement of an ink jet head.

FIG. 3 illustrates an example of the nozzle arrangement at the nozzle face 2a of the ink jet head 2. The ink jet head 2 has a nozzle face 2a having a plurality of nozzles through which the ink and treatment liquid compositions are ejected. In the embodiment illustrated in FIG. 3, the nozzle face 2a of the ink jet head 2 has ink nozzles grouped into 15a to 15d and treatment liquid nozzle group 16. The ink nozzles of a group are filled with an ink and arranged long in the sub-scanning direction. The nozzles of the treatment liquid nozzle group 16 are filled with the treatment liquid and arranged long in the sub-scanning direction. The nozzles of the treatment liquid nozzle group 16 may be arranged in a single line or a plurality of lines. In the embodiment illustrated in FIG. 3, the nozzles of the treatment liquid nozzle group 16 are arranged in a single line. In FIG. 3, MS represents the main scanning directions. Some of the ink nozzles, used to eject ink during printing are referred to as ink ejection nozzles. Similarly, some of the treatment liquid nozzles, used to eject the treatment liquid during printing are referred to as treatment liquid ejection nozzles.

In the embodiment illustrated in FIG. 3, the treatment liquid nozzle group 16 is coincident in position in the sub-scanning direction with the ink nozzle groups 15a to 15d. The coincident portion is the portion within the range represented by X in FIG. 3. X also represents the length in the sub-scanning direction of the region in which region 3A including the treatment liquid nozzle group 16 is coincident with regions 3B to 3E including the ink nozzle groups 15a to 15d. In the embodiment illustrated in FIG. 3, the coincident portions have a length in the sub-scanning direction, and the length is 100% of the length in the sub-scanning direction of the treatment liquid nozzle group 16 and also 100% of the lengths in the sub-scanning direction of the ink nozzle groups 15a to 15d. When all the nozzle groups with the coincident portions accounting for 100% of each nozzle group are used, the treatment liquid and the ink can be simultaneously applied in one scan, and accordingly, printing speed is increased. Also, this nozzle arrangement, in which the nozzle groups are arranged side by side, can downsize the printing apparatus including the ink jet head 2 and the carriage 9.

In the arrangement in FIG. 3, all the nozzles of ink nozzle groups 15a to 15d are ink ejection nozzles, and all the nozzles of the treatment liquid nozzle group 16 are treatment liquid ejection nozzles. In the nozzle arrangement in FIG. 3, therefore, when the ink ejection nozzle groups 15a to 15d and the treatment liquid ejection nozzle group 16 are projected in a direction MS parallel to the main scanning axis, the projected images have a coincident portion X. More specifically, the nozzle groups have coincident portions X parallel to the sub-scanning axis (direction SS) intersecting the main scanning axis (directions MS).

Figure 4:
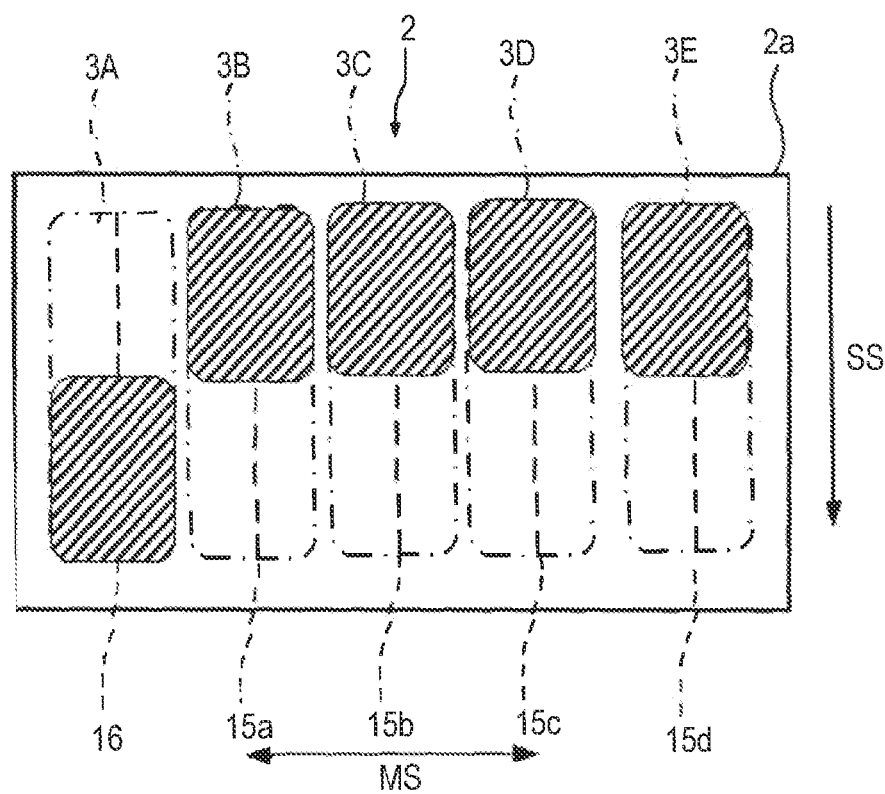
FIG. 4 is a schematic top view illustrating an ejection nozzle arrangement of an ink jet head.

FIG. 4 illustrates the nozzle arrangement depicted in FIG. 3. However, only the nozzles located upstream in the sub-scanning direction of the treatment liquid nozzle group 16 are used for ejection as treatment liquid ejection nozzles, and only the nozzles located downstream in the sub-scanning direction of the ink nozzle groups 15a to 15d are used for ejection as ink ejection nozzles. In this instance, the nozzles in the hatched region located downstream in the sub-scanning direction of the treatment nozzle group 16 are not used for printing, while the nozzles in the unhatched region located upstream in the sub-scanning direction define a treatment liquid ejection nozzle group used for printing. Also, the nozzles in the hatched regions located upstream in the sub-scanning direction of the ink nozzle groups 15a to 15d are not used for printing, while the nozzles in the unhatched regions located downstream in the sub-scanning direction define ink ejection nozzle groups used for printing. The treatment liquid ejection nozzle group and the ink ejection nozzle groups lie in a region between the most upstream nozzle and the most downstream nozzle in the sub-scanning direction of the respective treatment liquid and ink nozzle groups.

Thus, only the nozzles located upstream in the sub-scanning direction of the treatment liquid nozzles 16 can be used to eject the treatment liquid for printing. These nozzles of the treatment liquid nozzles, used to eject the treatment liquid are referred to as treatment liquid ejection nozzles. Also, only the nozzles located downstream in the sub-scanning direction of the ink nozzle groups 15a to 15d can be used to eject ink for printing.

In this configuration, the treatment liquid nozzle group 16 and the ink nozzle groups 15a to 15d are 100% coincident with each other, whereas the treatment liquid ejection nozzle group and the ink ejection nozzle groups are not coincident. In this instance, only the treatment liquid is first applied onto a position of the printing medium in one scan, and inks are then applied to the same position in the following scan. Since the inks are applied to the region that has received the entire amount of the treatment liquid that should be applied, the inks can certainly contact the treatment liquid to react sufficiently with the treatment liquid, thus increasing the image quality. However, only half of the nozzles of the ink jet head 2 are used, accordingly reducing the printing speed. Other configurations of the arrangement in FIG. 4 are the same as in the arrangement in FIG. 3.

In FIG. 4, the treatment liquid nozzle group 16 and the ink nozzle groups 15a to 15d are partially used for ejection as the treatment liquid ejection nozzles and the ink ejection nozzles. Thus, only the treatment liquid is first applied onto the printing medium in a scan, and inks are then applied to the same position or region of the printing medium in the following scan. In an embodiment, the treatment liquid nozzle group 16 and the ink nozzle groups 15a to 15d are respectively located upstream and downstream in the SS direction in advance. In this arrangement, only the treatment liquid can be applied onto the printing medium in a scan, and inks are then applied to the same position or region of the printing medium in the following scan.

6. PRINTING MEDIUM

The embodiments of the present disclosure use the ink set including the above-described specific ink and treatment liquid compositions to print a printing medium. The printing medium may be absorbent or resistant to absorption. The concept of the present disclosure is beneficial in printing absorption-resistant printing media to produce rub-resistant high-quality images.

Absorption-resistant printing media used herein are media exhibiting a liquid absorption rate of 10 mL/m$^2$ or less for a period of 30 ms$^{1/2}$ from the beginning of contact with a test solution, measured by the Bristow method. The test solution is composed of water and 1,2-hexanediol in a ratio of 95:5. The Bristow method is most commonly used for measuring liquid absorption for a short time, and Japan Technical Association of the Pulp and Paper Industry (JAPAN TAPPI) officially adopts this method. Details of this method are specified in Standard No. 51 (Paper and Paperboard-Liquid Absorption Test Method-Bristow's Method (in Japanese)) of JAPAN TAPPI Paper and Pulp Test Methods edited in 2000 (in Japanese).

The liquid absorption rate of the absorption-resistant printing media used herein may be 8.0 mL/m$^2$ or less, for example, 5.0 mL/m$^2$ or less, 4.0 mL/m$^2$ or less, 2.0 mL/m$^2$ or less, or 1.5 mL/m$^2$ or less. The ink set disclosed herein can form rub-resistant high-quality images even on absorption-resistant printing media exhibiting such low absorption.

Absorption-resistant printing media include non-absorbent printing media and poorly absorbent media. The poorly absorbent printing media may be provided with a coating layer capable of receiving ink on the surface thereof. The base material of such a poorly absorbent printing medium may be paper or a plastic film made of polyvinyl chloride, polyethylene terephthalate, polycarbonate, polystyrene, polyurethane, polyethylene, polypropylene, or the like.

Examples of the medium using paper as the base material may be book-printing paper, such as art paper, coated paper, or matte paper. The medium using a plastic film as the base material is coated with a hydrophilic polymer, or silica or titanium particles applied together with a binder.

Non-absorbent printing media include plastic films not surface-treated for ink jet printing (not having an ink-absorbing layer) and paper sheets or the like coated with or bonded to a plastic film. The term plastic mentioned here may be polyvinyl chloride, polyethylene terephthalate, polycarbonate, polystyrene, polyurethane, polyethylene, or polypropylene.

Such printing media may be translucent or transparent. Also, embossed printing media or the like having uneven surfaces may be used.

Absorbent printing media may also be used. Absorbent printing medium include plain paper, ink jet printing paper, and cloths. Absorbent printing media may exhibit a liquid absorption rate of more than 10 mL/m$^2$ for a period of 30 ms$^{1/2}$ from the beginning of contact with a test solution, measured by the Bristow method.

The present disclosure provides the following:

(1) An ink set is provided which includes an ink composition and a treatment liquid composition, and each of the ink composition and the treatment liquid composition is used for printing by being applied onto a printing medium by an ink jet method. The ink composition is a water-based composition containing a coloring material and a surfactant. The treatment liquid composition is a water-based composition containing a flocculant and a surfactant. Each of the surfactant contained in the ink composition and the surfactant contained in the treatment liquid composition includes a silicone surfactant whose 0.1 mass % aqueous solution has a surface tension of 32 mN/m or less, and any one of the surfactant contained in the ink composition and the surfactant contained in the treatment liquid composition includes a silicone surfactant whose 0.1 mass % solution in a nitrogen-containing solvent has a surface tension of 32 mN/m or less. Any one of the ink composition and the treatment liquid composition contains any one of a nitrogen-containing solvent, a sulfur-containing solvent, and a cyclic ester.

(2) In the ink set of (1), the surfactant contained in the treatment liquid composition may include the silicone surfactant whose 0.1 mass % solution in the nitrogen-containing solvent has a surface tension of 32 mN/m or less.

(3) In the ink set of (1), each of the ink composition and the treatment liquid composition may contain any one of a nitrogen-containing solvent, a sulfur-containing solvent, and a cyclic ester.

(4) In the ink set of (1), any one of the surfactant contained in the ink composition and the surfactant contained in the treatment liquid composition may include a silicone surfactant whose 0.1 mass % aqueous solution and 0.1 mass % solution in the nitrogen-containing solvent have surface tensions of 32 mN/m or less.

(5) In the ink set of (1), the silicone surfactant whose 0.1 mass % solution in the nitrogen-containing solvent has a surface tension of 32 mN/m or less may be a silicone surfactant that has a surface tension of 32 mN/m or less when the nitrogen-containing solvent is 2-pyrrolidone.

(6) In the ink set of (1), the total content, in each of the ink composition and the treatment liquid composition, of the silicone surfactant whose 0.1 mass % aqueous solution has a surface tension of 32 N/m or less and the silicone surfactant whose 0.1 mass % solution in the nitrogen-containing solvent has a surface tension of 32 mN/m or less may be 0.1% to 4% relative to the total mass of the composition.

(7) The ink set of (1), wherein the flocculant may include any one of a multivalent metal salt, a cationic polymer, and an organic acid.

(8) In the ink set of (1), any one of the ink composition and the treatment liquid composition may contain a nitrogen-containing solvent.

(9) In the ink set of (1), any one of the ink composition and the treatment liquid composition may contain a nitrogen-containing solvent represented by any one of the formulas (1) to (4).

(10) In the ink set of (1), any one of the ink composition and the treatment liquid composition may contain a solvent selected from a nitrogen-containing solvent, a sulfur-containing solvent, and a cyclic ester in a proportion of 40% or more relative to the total mass of an organic solvent in the composition.

(11) The ink set of (1) may be used for printing on a poorly absorbent or non-absorbent printing medium.

(12) A printing method using the ink set of (1) is provided. The method includes applying the ink composition onto a printing medium by an ink jet method, and applying the treatment liquid composition onto the printing medium by an ink jet method.

(13) In the printing method of (12), the ink composition with a temperature of 20° C. to 45° C. may be applied onto a printing medium with a temperature higher than the temperature of the ink composition by 0° C. to 5° C., and treatment liquid composition with a temperature of 20° C. to 45° C. may be applied onto the printing medium with a temperature higher than the temperature of the treatment liquid composition by 0° C. to 5° C.

(14) In the printing method of (12), printing may be performed by repeating main scans and sub-scans and the ink composition and the treatment liquid composition may be applied onto a same region of the printing medium by being ejected in an identical main scan.

7. EXAMPLES

The above-described embodiments will be further described in detail with reference to Examples and Comparative Examples, but the implementation of the present disclosure is not limited to the Examples.

7. 1. Preparation of Treatment Liquids and Inks

Constituents were mixed in the proportions presented in Table 1 or 2 and stirred. The mixture was filtered through a membrane filter of 5 μm in pore size. Thus, the treatment liquid and ink compositions were prepared for each Example. For the pigment, a pigment dispersion liquid was prepared in advance according to the procedure described later herein. The values in Tables represent the contents by mass of the respective constituents, and the total mass of the compositions after adding ion-exchanged water is 100% by mass. The values for the pigment and the wax presented in Tables 1 and 2 represent their solids contents. The specific organic solvents presented in the Tables are nitrogen-containing solvents, a sulfur-containing solvent, and a cyclic ester.

TABLE 1

| | | Ink A | Ink B | Ink C | Ink D | Ink E | Ink F | Ink G | Ink H |
|---|---|---|---|---|---|---|---|---|---|
| Specific organic solvent | 2P (Formula (4)) | 18 | 18 | 18 | 18 | — | — | — | 6 |
| | MPA (Formula (2)) | — | — | — | — | 18 | — | — | — |
| | DMIB (Formula (3)) | — | — | — | — | — | 18 | — | — |
| | DMAA (Formula (1)) | — | — | — | — | — | — | 18 | 12 |
| | GBL | — | — | — | — | — | — | — | — |
| | SF | — | — | — | — | — | — | — | — |
| Other organic solvents | PG | 14 | 14 | 14 | 14 | 14 | 14 | 14 | 14 |
| | 1,2HD | 2 | 2 | 2 | 2 | 2 | 2 | 2 | 2 |
| Pigment dispersion liquid | Cyan pigment dispersion liquid (Solids) | 4 | 4 | 4 | 4 | 4 | 4 | 4 | 4 |
| Resin | JONCRYL 631 (Solids) | 6 | 6 | 6 | 6 | 6 | 6 | 6 | 6 |
| Wax | HYTEC E-6500 (Solids) | 1 | 1 | 1 | 1 | 1 | 1 | 1 | 1 |
| Silicone surfactant | SAG503A (Condition 1) | 1 | 1 | — | — | 1 | 1 | 1 | 1 |
| | BYK333 (Condition 2) | — | 0.5 | — | 0.5 | — | — | — | — |
| | SAG005 (Conditions 1 and 2) | — | — | 1 | — | — | — | — | — |
| | TEGO WET 280 (Condition 1) | — | — | — | — | — | — | — | — |
| Other surfactants | Tivida FL2500 | — | — | — | — | — | — | — | — |
| | E1010 | — | — | — | — | — | — | — | — |
| Antifoaming agent | SURFYNOL DF110D | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Total | 100 | 100 | 100 | 100 | 100 | 100 | 100 | 100 |
| | Percentage (%) of specific organic solvent to all organic solvents | 53 | 53 | 53 | 53 | 53 | 53 | 53 | 53 |
| | Surfactant condition 1 | ✓ | ✓ | ✓ | — | ✓ | ✓ | ✓ | ✓ |
| | Surfactant condition 2 | — | ✓ | ✓ | ✓ | — | — | — | — |

TABLE 1-continued

|  |  | Ink I | Ink J | Ink K | Ink L | Ink M | Ink N | Ink O | Ink P |
|---|---|---|---|---|---|---|---|---|---|
| Specific organic solvent | 2P (Formula (4)) | 12 | 18 | 18 | 18 | 18 | — | — | — |
|  | MPA (Formula (2)) | — | — | — | — | — | — | — | — |
|  | DMIB (Formula (3)) | — | — | — | — | — | — | — | — |
|  | DMAA (Formula (1)) | — | — | — | — | — | — | — | — |
|  | GBL | — | — | — | — | — | — | 18 | — |
|  | SF | — | — | — | — | — | — | — | 18 |
| Other organic solvents | PG | 14 | 14 | 14 | 14 | 14 | 20 | 14 | 14 |
|  | 1,2HD | 2 | 2 | 2 | 2 | 2 | 5 | 2 | 2 |
| Pigment dispersion liquid | Cyan pigment dispersion liquid (Solids) | 4 | 4 | 4 | 4 | 4 | 4 | 4 | 4 |
| Resin | JONCRYL 631 (Solids) | 6 | 6 | 6 | 6 | 6 | 6 | 6 | 6 |
| Wax | HYTEC E-6500 (Solids) | 1 | 1 | 1 | 1 | 1 | 1 | 1 | 1 |
| Silicone surfactant | SAG503A (Condition 1) | 1 | — | — | — | — | 1 | 1 | 1 |
|  | BYK333 (Condition 2) | — | — | — | — | — | — | — | — |
|  | SAG005 (Conditions 1 and 2) | — | — | — | — | — | — | — | — |
|  | TEGO WET 280 (Condition 1) | — | 1 | — | — | — | — | — | — |
| Other surfactants | Tivida FL2500 | — | — | 1 | — | — | — | — | — |
|  | E1010 | — | — | — | 1 | — | — | — | — |
| Antifoaming agent | SURFYNOL DF110D | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Total | 100 | 100 | 100 | 100 | 100 | 100 | 100 | 100 |
|  | Percentage (%) of specific organic solvent to all organic solvents | 43 | 53 | 53 | 53 | 53 | 0 | 53 | 53 |
|  | Surfactant condition 1 | ✓ | ✓ | — | — | — | ✓ | ✓ | ✓ |
|  | Surfactant condition 2 | — | — | — | — | — | — | — | — |

TABLE 2

|  |  | Treatment liquid A | Treatment liquid B | Treatment liquid C | Treatment liquid D | Treatment liquid E | Treatment liquid F |
|---|---|---|---|---|---|---|---|
| Specific organic solvent | 2P (Formula (4)) | 18 | 18 | 18 | 18 | 18 | 8 |
|  | MPA (Formula (2)) | — | — | — | — | — | — |
| Other organic solvents | PG | 14 | 14 | 14 | 14 | 14 | 14 |
|  | 1,2HD | 2 | 2 | 2 | 2 | 2 | 2 |
| flocculant | Calcium acetate monohydrate | 5 | 5 | 5 | 5 | — | — |
|  | Malonic acid | — | — | — | — | 5 | — |
|  | CATIOMASTER PD-7 (Solids) | — | — | — | — | — | 5 |
| Silicone surfactant | SAG503A (Condition 1) | 1 | 1 | — | — | 1 | 1 |
|  | BYK333 (Condition 2) | 0.5 | — | — | 0.5 | 0.5 | 0.5 |
|  | SAG005 (Conditions 1 and 2) | — | — | 1 | — | — | — |
|  | SAG008 (Condition 2) | — | — | — | — | — | — |
|  | TEGO WET 270 (Conditions 1 and 2) | — | — | — | — | — | — |
| Antifoaming agent | SURFYNOL DF110D | 0.1 | 0.1 | 0.1 | 0.1 | 0.1 | 0.1 |
|  | Pure water | Balance | Balance | Balance | Balance | Balance | Balance |
|  | Total | 100 | 100 | 100 | 100 | 100 | 100 |
|  | Percentage (%) of specific organic solvent to all organic solvents | 53 | 53 | 53 | 53 | 53 | 53 |
|  | Surfactant condition 1 | ✓ | ✓ | ✓ | — | ✓ | ✓ |
|  | Surfactant condition 2 | ✓ | — | — | ✓ | ✓ | ✓ |

TABLE 2-continued

|  |  | Treatment liquid G | Treatment liquid H | Treatment liquid I | Treatment liquid J | Treatment liquid K |
| --- | --- | --- | --- | --- | --- | --- |
| Specific organic solvent | 2P (Formula (4)) | 18 | 18 | 18 | — | — |
|  | MPA (Formula (2)) | — | — | — | 18 | — |
| Other organic solvents | PG | 14 | 14 | 14 | 14 | 20 |
|  | 1,2HD | 2 | 2 | 2 | 2 | 5 |
| flocculant | Calcium acetate monohydrate | 5 | 5 | 5 | 5 | 5 |
|  | Malonic acid | — | — | — | — | — |
|  | CATIOMASTER PD-7 (Solids) | — | — | — | — | — |
| Silicone surfactant | SAG503A (Condition 1) | 3 | 1 | — | 1 | 1 |
|  | BYK333 (Condition 2) | 0.5 | — | — | 0.5 | 0.5 |
|  | SAG005 (Conditions 1 and 2) | — | — | — | — | — |
|  | SAG008 (Condition 2) | — | 0.5 | — | — | — |
|  | TEGO WET 270 (Conditions 1 and 2) | — | — | 1 | — | — |
| Antifoaming agent | SURFYNOL DF110D | 0.1 | 0.1 | 0.1 | 0.1 | 0.1 |
|  | Pure water | Balance | Balance | Balance | Balance | Balance |
|  | Total | 100 | 100 | 100 | 100 | 100 |
| Percentage (%) of specific organic solvent to all organic solvents |  | 53 | 53 | 53 | 53 | 0 |
| Surfactant condition 1 |  | ✓ | ✓ | ✓ | ✓ | ✓ |
| Surfactant condition 2 |  | ✓ | ✓ |  | ✓ | ✓ |

The constituents presented in the Tables are as follows.

The pigment dispersion liquid was prepared as below. Methyl ethyl ketone, or MEK, (50 g) was added into a flask equipped with a dropping funnel, a nitrogen inlet, a reflux condenser, a thermometer, and a stirrer, followed by heating to 75° C. with nitrogen bubbling. A mixture of monomers (75 g of n-butyl methacrylate, 5 g of butyl acrylate, 5 g of 2-hydroxyethyl methacrylate, and 15 g of acrylic acid), 50 g of MEK, and 500 mg of a polymerization initiator (AIBN) was dropped into the flask through the dropping funnel over 3 hours. Then, the resulting mixture was heated and refluxed for 6 hours. After natural cooling, the evaporated portion of MEK was added to yield a resin solution (resin solids content: 50 mass %, acid value: 117 mg/KOH, weight average molecular weight: 12000). To 20 g of the resin solution, 20 mass % sodium hydroxide aqueous solution was added as a neutralizer to neutralize 100% of the groups that would form salts. Then, 50 g of C.I. Pigment Blue 15:3 was gradually added to the neutralized solution, followed by kneading in a bead mill for 2 hours. Ion-exchanged water (200 g) was added to the kneaded product, followed by stirring and then heating under reduced pressure to remove MEK. Ion-exchanged water was further added to adjust the solids content, thus obtaining a pigment dispersion liquid (pigment solids content: 20 mass %).

Other constituents are as follows:

Resin: JONCRYL 631 (styrene-acrylic resin emulsion, produced by BASF)

Wax: HYTEC E-6500 (polyethylene wax emulsion, produced by Toho Chemical Industry)

CATIOMASTER PD-7: Cationic resin, amine-epichlorohydrin condensation polymer, produced by Yokkaichi Chemical SURFYNOL DF110D: Acetylenediol-based antifoaming agent, produced by Evonik Industries 2P: 2-Pyrrolidone, normal boiling point 245° C., nitrogen-containing solvent of formula (4)

MPA: 3-Methoxy-N,N-dimethylpropanamide, normal boiling point 215° C., nitrogen-containing solvent of formula (2)

DMIB: N,N-Dimethyrlisobutyramide, normal boiling point 175° C., nitrogen-containing solvent of formula (3)

DMAA: N,N-dimethylacetamide, normal boiling point 220° C., nitrogen-containing solvent of formula (1)

GBL: γ-Butyrolactone, normal boiling point 204° C., cyclic ester

SF: Sulfolane, normal boiling point 285° C., sulfur-containing solvent

PG: Propylene glycol, normal boiling point 188° C.

1,2HD: 1,2-Hexanediol, normal boiling point 224° C.

SAG503A: Silicone surfactant, produced by Nissin Chemical Industry

BYK 333: Silicone surfactant, produced by BYK

SAG005: Silicone surfactant, produced by Nissin Chemical Industry

TEGO WET 280: Silicone surfactant, produced by Evonik Industries

SAG008: Silicone surfactant, produced by Nissin Chemical Industry

TEGO WET 270: Silicone surfactant, produced by Evonik Industries

E1010: OLFINE E1010, acetylene glycol-based surfactant, produced by Nissin Chemical Industry Tivida FL2500: Fluorosurfactant, produced by Merck 7. 2. Surface Tensions of Surfactants For each surfactant, 0.1 mass % solutions in water and a nitrogen-containing solvent were prepared as described above. The nitrogen-containing solvents presented in Table 3 were used for preparing the surfactant solutions in a nitrogen-containing solvent. The surface tension was measured at 25° C. with an automatic surface tensiometer CBVP-Z (manufactured by Kyowa Interface Science). The measurements are presented in Table 3.

TABLE 3

|  | Aqueous solution | Nitrogen-containing solvent solution | | | | |
|---|---|---|---|---|---|---|
|  |  | Solution 1 | Solution 2 | Solution 3 | Solution 4 | Solution 5 |
| 2P | — | 99.9 | — | — | — | 33.3 |
| MPA | — | — | 99.9 | — | — | — |
| DMIB | — | — | — | 99.9 | — | — |
| DMAA | — | — | — | — | 99.9 | 66.6 |
| Pure water | 99.9 | — | — | — | — | — |
| Surfactant | 0.1 | 0.1 | 0.1 | 0.1 | 0.1 | 0.1 |
| Surfactant varieties ↓ | Surface tension (mN/m) ↓ | | | | | |
| SAG503A (Condition 1) | 22.4 | 36.4 | 36.1 | 33.2 | 38.6 | 38.2 |
| BYK333 (Condition 2) | 33.5 | 26.1 | 26.2 | 26.6 | 24.1 | 26.1 |
| SAG005 (Conditions 1 and 2) | 31.7 | 24.7 | 25.2 | 25.5 | 24.4 | 25.3 |
| TEGO WET 280 (Condition 1) | 23.3 | 34.4 | 34.8 | 34.9 | 34.1 | 34.2 |
| SAG008 (Condition 2) | 32.5 | 24.9 | 25.1 | 25.3 | 24.1 | 24.6 |
| TEGO WET 270 (Conditions 1 and 2) | 24.8 | 27.8 | 28.2 | 28.5 | 27.2 | 27.5 |
| Tivida FL2500 | 19.1 | 44.3 | 44.6 | 44.9 | 43.8 | 44.0 |
| E1010 | 38.1 | 47.0 | 47.5 | 47.6 | 46.5 | 46.9 |

In Tables 1 to 3, Condition 1 following some surfactant names represents that the surfactant is a silicone surfactant whose 0.1 mass % aqueous solution has a surface tension of 32 mN/m or less. Also, Condition 2 represents the surfactant is a silicone surfactant whose 0.1 mass % solution in a nitrogen-containing solvent has a surface tension of 32 mN/m or less. Conditions 1 and 2 represents that the surfactant is a silicone surfactant whose 0.1 mass % aqueous solution and 0.1 mass % solution in a nitrogen-containing solvent have surface tensions of 32 mN/m or less.

Surfactant Condition 1 presented at lower positions in Tables 1 and 2 represents that the composition contains a silicone surfactant whose 0.1 mass % aqueous solution has a surface tension of 32 mN/m or less. Also, Condition 2 at lower positions in the Tables represents the composition contains a silicone surfactant whose 0.1 mass % solution in a nitrogen-containing solvent has a surface tension of 32 mN/m or less. One checkmark across surfactant conditions 1 and 2 represents that the composition contains a silicone surfactant whose 0.1 mass % aqueous solution and 0.1 mass % solution in a nitrogen-containing solvent have surface tensions of 32 mN/m or less.

7. 3. Printing Test

Printing was performed using various combinations of the treatment liquid and ink compositions under the conditions presented in Tables 4 and 5. For the printing test, a test machine was prepared by modifying an ink jet printer SC-S80650 (manufactured by Seiko Epson), particularly its heaters. This ink jet printer is a serial type.

For the nozzle arrangement of the head, arrangement 1 represents the ink and treatment liquid were simultaneously ejected in a nozzle arrangement as illustrated in FIG. 3 in which the ink ejection nozzle group and the treatment liquid ejection nozzle group have a coincident portion when the nozzles are projected in either of the main scanning directions. The treatment liquid nozzle group 16 and the ink nozzle group 15a were used for printing test. Arrangement 2 represents that the treatment liquid was first applied and followed by applying the ink in a nozzle arrangement as illustrated in FIG. 4 in which the ink ejection nozzle group and the treatment liquid ejection nozzle group are respectively located upstream and downstream in the sub-scanning direction.

The ink and the treatment liquid were applied to the same pattern, one on top of the other. The treatment liquid and the ink were each applied by 8 passes.

The heaters were disposed as shown in FIG. 1 for heating the printing medium at controlled temperatures. The surface temperature (highest temperature) of the portion of the printing medium 10 opposing the ink jet head 2 was controlled during printing to the temperature presented in the Tables by operating the platen heater 4 and the preheater 7. The ink temperature (highest temperature) during ejection of printing was as presented in the Tables. This temperature was obtained by measuring the temperature of the nozzle face 2a. The treatment liquid temperature during ejection is considered to be the same as the ink temperature during ejection. Temperatures were measured with a thermocouple.

The amounts of the compositions applied are presented as the ink application rate and the treatment liquid percentage in the Tables. The resolution was 720 dpi×1440 dpi. The printed samples were subjected to secondary drying at 90° C. with an after-heater. The printing medium was a PVC film Orajet 3165G (manufactured by ORAFOL).

The printing medium set in the printer was printed by alternately repeating mains scans by the carriage equipped with the head and sub-scans of transporting the printing medium.

TABLE 4

|  | Example 1 | Example 2 | Example 3 | Example 4 | Example 5 | Example 6 | Example 7 | Example 8 |
|---|---|---|---|---|---|---|---|---|
| Ink | Ink A | Ink B | Ink C | Ink E | Ink F | Ink G | Ink H | Ink I |
| Treatment liquid | Treatment liquid A | Treatment liquid B | Treatment liquid C | Treatment liquid A | Treatment liquid A | Treatment liquid A | Treatment liquid A | Treatment liquid A |
| Ink application rate (mg/inch$^2$) | 12 | 12 | 12 | 12 | 12 | 12 | 12 | 12 |
| Percentage (mass %) of treatment application to ink application | 12 | 12 | 12 | 12 | 12 | 12 | 12 | 12 |

TABLE 4-continued

|  |  | | | | | | | | |
|---|---|---|---|---|---|---|---|---|---|
|  | Head nozzle arrangement | Arrangement 1 | Arrangement 1 | Arrangement 1 | Arrangement 1 | Arrangement 1 | Arrangement 1 | Arrangement 1 | Arrangement 1 |
|  | Ink temperature (° C.) during ejection | 37 | 37 | 37 | 37 | 37 | 37 | 37 | 37 |
|  | Printing medium temperature (° C.) | 40 | 40 | 40 | 40 | 40 | 40 | 40 | 40 |
| Ink | Surfactant condition 1 | ✓ | ✓ | ✓ | ✓ | ✓ | ✓ | ✓ | ✓ |
|  | Surfactant condition 2 | — | ✓ |  | — | — | — | — | — |
| Treatment liquid | Surfactant condition 1 | ✓ | ✓ | ✓ | ✓ | ✓ | ✓ | ✓ | ✓ |
|  | Surfactant condition 2 | ✓ | — | | ✓ | ✓ | ✓ | ✓ | ✓ |
|  | Image quality | A | A | A | A | A | A | A | A |
|  | Recovery from clogging (dry) | AA | B | A | B | B | A | A | A |
|  | Recovery from clogging (mixing) | A | A | A | A | A | A | A | A |
|  | Rub resistance | A | A | A | AA | AA | AA | AA | A |

|  |  | Example 9 | Example 10 | Example 11 | Example 12 | Example 13 | Example 14 | Example 15 | Example 16 |
|---|---|---|---|---|---|---|---|---|---|
|  | Ink | Ink J | Ink O | Ink P | Ink A | Ink A | Ink A | Ink A | Ink C |
|  | Treatment liquid | Treatment liquid A | Treatment liquid A | Treatment liquid A | Treatment liquid E | Treatment liquid F | Treatment liquid G | Treatment liquid H | Treatment liquid I |
|  | Ink application rate (mg/inch$^2$) | 12 | 12 | 12 | 12 | 12 | 12 | 12 | 12 |
|  | Percentage (mass %) of treatment application to ink application | 12 | 12 | 12 | 12 | 12 | 12 | 12 | 12 |
|  | Head nozzle arrangement | Arrangement 1 | Arrangement 1 | Arrangement 1 | Arrangement 1 | Arrangement 1 | Arrangement 1 | Arrangement 1 | Arrangement 1 |
|  | Ink temperature (° C.) during ejection | 37 | 37 | 37 | 37 | 37 | 37 | 37 | 37 |
|  | Printing medium temperature (° C.) | 40 | 40 | 40 | 40 | 40 | 40 | 40 | 40 |
| Ink | Surfactant condition 1 | ✓ | ✓ | ✓ | ✓ | ✓ | ✓ | ✓ | ✓ |
|  | Surfactant condition 2 | — | — | — | — | — | — | — | — |
| Treatment liquid | Surfactant condition 1 | ✓ | ✓ | ✓ | ✓ | ✓ | ✓ | ✓ | ✓ |
|  | Surfactant condition 2 | ✓ | ✓ | ✓ | ✓ | ✓ | ✓ | ✓ |  |
|  | Image quality | A | B | B | B | AA | AA | A | A |
|  | Recovery from clogging (dry) | AA | B | B | AA | AA | AA | AA | A |
|  | Recovery from clogging (mixing) | A | B | B | A | B | A | A | A |
|  | Rub resistance | A | A | A | A | A | B | A | A |

TABLE 5

|  |  | Example 17 | Example 18 | Example 19 | Example 20 | Example 21 | Example 22 | Example 23 | Example 24 |
|---|---|---|---|---|---|---|---|---|---|
|  | Ink | Ink A | Ink A | Ink B | Ink A | Ink A | Ink A | Ink A | Ink A |
|  | Treatment liquid | Treatment liquid J | Treatment liquid K | Treatment liquid A | Treatment liquid C | Treatment liquid A | Treatment liquid A | Treatment liquid A | Treatment liquid A |
|  | Ink application rate (mg/inch$^2$) | 12 | 12 | 12 | 12 | 12 | 12 | 12 | 12 |
|  | Percentage (mass %) of treatment application to ink application | 12 | 12 | 12 | 12 | 12 | 12 | 20 | 6 |
|  | Head nozzle arrangement | Arrangement 1 | Arrangement 1 | Arrangement 1 | Arrangement 1 | Arrangement 1 | Arrangement 1 | Arrangement 1 | Arrangement 1 |
|  | Ink temperature (° C.) during ejection | 37 | 37 | 37 | 37 | 30 | 42 | 37 | 37 |
|  | Printing medium temperature (° C.) | 40 | 40 | 40 | 40 | 33 | 46 | 40 | 40 |
| Ink | Surfactant condition 1 | ✓ | ✓ | ✓ | ✓ | ✓ | ✓ | ✓ | ✓ |
|  | Surfactant condition 2 | — | — | ✓ | — | — | — | — | — |

TABLE 5-continued

|  |  | | | | | | | | |
|---|---|---|---|---|---|---|---|---|---|
| Treatment liquid | Surfactant condition 1 | ✓ | ✓ | ✓ | ✓ | ✓ | ✓ | ✓ | ✓ |
|  | Surfactant condition 2 | ✓ | ✓ | ✓ |  | ✓ | ✓ | ✓ | ✓ |
| Image quality | | A | B | AA | A | B | AA | AA | B |
| Recovery from clogging (dry) | | AA | AA | B | AA | AA | C | AA | AA |
| Recovery from clogging (mixing) | | A | AA | A | AA | A | A | A | A |
| Rub resistance | | B | B | A | A | A | A | B | AA |

|  |  | Example 25 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Ink | | Ink A | Ink D | Ink A | Ink A | Ink K | Ink L | Ink M | Ink N |
| Treatment liquid | | Treatment liquid F | Treatment liquid B | Treatment liquid D | Treatment liquid B | Treatment liquid A | Treatment liquid A | Treatment liquid A | Treatment liquid K |
| Ink application rate (mg/inch$^2$) | | 12 | 12 | 12 | 12 | 12 | 12 | 12 | 12 |
| Percentage (mass %) of treatment application to ink application | | 12 | 12 | 12 | 12 | 12 | 12 | 12 | 12 |
| Head nozzle arrangement | | Arrangement 2 | Arrangement 1 | Arrangement 1 | Arrangement 1 | Arrangement 1 | Arrangement 1 | Arrangement 1 | Arrangement 1 |
| Ink temperature (° C.) during ejection | | 37 | 37 | 37 | 37 | 37 | 37 | 37 | 37 |
| Printing medium temperature (° C.) | | 40 | 40 | 40 | 40 | 40 | 40 | 40 | 40 |
| Ink | Surfactant condition 1 | ✓ | — | ✓ | ✓ | — | — | — | ✓ |
|  | Surfactant condition 2 | — | ✓ | — | — | — | — | — | — |
| Treatment liquid | Surfactant condition 1 | ✓ | ✓ | — | ✓ | ✓ | ✓ | ✓ | ✓ |
|  | Surfactant condition 2 | ✓ | — | ✓ | — | ✓ | ✓ | ✓ | ✓ |
| Image quality | | AA | C | C | C | C | C | C | C |
| Recovery from clogging (dry) | | AA | B | AA | AA | AA | A | C | AA |
| Recovery from clogging (mixing) | | AA | A | A | AA | A | A | C | AA |
| Rub resistance | | A | A | A | A | A | A | A | C |

7. 4. Evaluation 7. 4. 1. Image Quality

The printed patterns formed in the printing test were visually observed.

(Criteria)

AA: The ink is evenly applied, and the pattern has no inconsistencies in density.

A: The pattern includes some portions with slight inconsistencies in ink density.

B: The pattern includes many portions with slight inconsistencies in ink density.

C: The pattern includes many portions with large inconsistencies in ink density.

7. 4. 2. Rub Resistance

The printed test pattern was cut into a rectangular piece of 30 mm×150 mm. The rectangular piece was rubbed with a plain-woven cloth 50 times with a JSPS ablation resistance tester at a load of 500 g, and the degree of ink peeling was examined.

(Criteria)

AA: No peeling

A: Less than 10% of the examined area was peeled.

B: 10% to less than 50% of the examined area was peeled.

C: 50% or more of the examined area was peeled.

7. 4. 3. Recovery from Dry Clogging

Mock printing was conducted under printing test conditions, except that half of the nozzles in the ink nozzle line were contaminated with air bubbles, intentionally causing half of the nozzles to fail in ejection. In this state, mock printing for passing the ink jet head without ejecting the ink or the like was performed for 3 hours. After printing, the nozzles were cleaned three times. Then, the nozzles were examined for the number of nozzles that failed in ejection. One cleaning operation caused 1 g of ink to discharge through the nozzles. A nozzle line has 360 nozzles. Ejection failure was produced by wiping the nozzle face with a nonwoven cloth BEMCOT (registered trademark) moistened with water.

(Criteria)

AA: No nozzles failed in ejection.

A: Less than 3% of the nozzles failed in ejection.

B: 3% to less than 5% of the nozzles failed in ejection.

C: 5% or more of the nozzles failed in ejection.

7. 4. 4. Recovery from Clogging Resulting from Liquid Mixing

The ink and the treatment liquid in their nozzle lines were ejected under the printing test conditions and, it was confirmed that the compositions were successfully ejected from all the nozzles. Then, the ink and treatment liquid were discharged at one time at a rate of 1 g per nozzle line with a suction cleaning mechanism After discharge, the wiper mechanism wiped the nozzle face along the nozzle lines. Then, ink nozzles were examined for the number of nozzles failed in ejection. The results were evaluated according to the same criteria as the recovery from dry clogging.

7. 5. Evaluation Results

Evaluation results are presented in Tables 4 and 5.

In all the Examples, both the ink and the treatment liquid contained a silicone surfactant whose 0.1 mass % aqueous solution has a surface tension of 32 mN/m less, either the ink or the treatment liquid contained a silicone surfactant whose 0.1 mass % solution in a nitrogen-containing solvent has a surface tension of 32 mN/m or less, and either the ink or the treatment liquid contained a nitrogen-containing solvent, a sulfur-containing solvent, or a cyclic ester. Such combinations of an ink and a treatment liquid produced high image quality. In contrast, Comparative Examples not suing such combinations produced poor image quality. Details of the evaluation results will be described.

The results of Examples 1 and 2 show that the combination in which Surfactant B is contained in the treatment liquid is helpful for recovery from dry clogging compared to the combination in which Surfactant B is contained in the ink.

The results of Examples 1 and 20 show that the combination using the treatment liquid containing Surfactant AB is helpful for recovery from clogging resulting from liquid mixing compared to the combination using the treatment liquid containing Surfactants a and b.

The results of Examples 1 and 18 show that the combination in which both the ink and the treatment liquid contain a nitrogen-containing solvent is effective in producing high rub resistance and image quality compared to the combination in which either contains the nitrogen-containing solvent.

The results of Examples 1 and 4 to 9 show that the nitrogen-containing solvents are more effective than the sulfur-containing solvent and the cyclic ester in terms of image quality and recovery from clogging. Also, the nitrogen-containing solvent represented by formula (4) is more effective in terms of image quality and recovery from clogging, while the nitrogen-containing solvents represented by formulas (1), (2), and (3) are more effective in terms of rub resistance. Another test for rub resistance at a higher load, whose results are not presented in the Tables, suggest that solvents represented by formulas (1) and (2) are more effective than solvents represented by formula (3) in terms of rub resistance and that solvents of formula (1) are still more effective.

Comparative Examples 1, 4, and 5 resulted in poor image quality because the inks did not contain Surfactant A. Comparative Example 4 resulted in poor image quality despite using an ink containing a fluorosurfactant. Although the solution of the fluorosurfactant exhibited a low surface tension, the image quality was poor.

Comparative Example 2 also resulted in poor image quality because the treatment liquid did not contain Surfactant A.

Comparative Example 3 resulted in poor image quality because both the ink and the treatment liquid did not contain Surfactant B.

Comparative Example 6 resulted in poor image quality because the ink did not contain any surfactant. Since the ink did not contain any surfactant, ink ejection was inconsistent, and recovery from clogging was poor.

Comparative Example 7 resulted in poor image quality and rub resistance because both the ink and the treatment liquid did not contain any nitrogen-containing solvent, sulfur-containing solvent, or cyclic ester.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. An ink set comprising:
an ink composition; and
a treatment liquid composition,
wherein
each of the ink composition and the treatment liquid composition is used for printing by being applied onto a printing medium by an ink jet method,
the ink composition is a water-based composition containing a coloring material and a surfactant,
the treatment liquid composition is a water-based composition containing a flocculant and a surfactant,
each of the surfactant contained in the ink composition and the surfactant contained in the treatment liquid composition includes a silicone surfactant whose 0.1 mass % aqueous solution has a surface tension of 32 mN/m or less,
any one of the surfactant contained in the ink composition and the surfactant contained in the treatment liquid composition includes a silicone surfactant whose 0.1 mass % solution in a nitrogen-containing solvent has a surface tension of 32 mN/m or less,
any one of the ink composition and the treatment liquid composition contains any one of a nitrogen-containing solvent, a sulfur-containing solvent, and a cyclic ester, and
any one of the ink composition and the treatment liquid composition contains a nitrogen-containing solvent represented by any one of following formulas (1), (3) and (4):

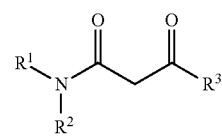

(1)

wherein $R^1$ and $R^2$ each independently represent one selected from the group consisting of a hydrogen atom and alkyl groups with 1 to 5 carbon atoms, and $R^3$ represents an alkyl group with 1 to 5 carbon atoms;

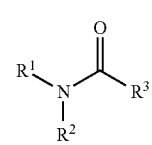

(3)

wherein $R^1$ and $R^2$ each independently represent one selected from the group consisting of a hydrogen atom and alkyl groups with 1 to 5 carbon atoms, and $R^3$ represents an alkyl group with 1 to 5 carbon atoms;

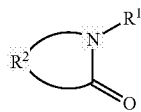 (4)

wherein $R^1$ represents one selected from the group consisting of a hydrogen atom and an alkyl or alkenyl group with 1 to 6 carbon atoms, and $R^2$ represents an alkylene group with 1 to 6 carbon atoms that is a part of a cyclic amide ring.

2. The ink set according to claim 1, wherein the surfactant contained in the treatment liquid composition includes the silicone surfactant whose 0.1 mass % solution in the nitrogen-containing solvent has a surface tension of 32 mN/m or less.

3. The ink set according to claim 1, wherein each of the ink composition and the treatment liquid composition contains any one of a nitrogen-containing solvent, a sulfur-containing solvent, and a cyclic ester.

4. The ink set according to claim 1, wherein any one of the surfactant contained in the ink composition and the surfactant contained in the treatment liquid composition includes a silicone surfactant whose 0.1 mass % aqueous solution and 0.1 mass % solution in the nitrogen-containing solvent have surface tensions of 32 mN/m or less.

5. The ink set according to claim 1, wherein the silicone surfactant whose 0.1 mass % solution in the nitrogen-containing solvent has a surface tension of 32 mN/m or less is a silicone surfactant that has a surface tension of 32 mN/m or less when the nitrogen-containing solvent is 2-pyrrolidone.

6. The ink set according to claim 1, wherein a total content, in each of the ink composition and the treatment liquid composition, of the silicone surfactant whose 0.1 mass % aqueous solution has a surface tension of 32 N/m or less and the silicone surfactant whose 0.1 mass % solution in the nitrogen-containing solvent has a surface tension of 32 mN/m or less is 0.1% to 4% relative to a total mass of the composition.

7. The ink set according to claim 1, wherein the flocculant includes any one of a multivalent metal salt, a cationic polymer, and an organic acid.

8. The ink set according to claim 1, wherein any one of the ink composition and the treatment liquid composition contains a nitrogen-containing solvent.

9. The ink set according to claim 1, wherein any one of the ink composition and the treatment liquid composition contains a nitrogen-containing solvent represented by the formula (4).

10. The ink set according to claim 1, wherein any one of the ink composition and the treatment liquid composition contains a solvent selected from a nitrogen-containing solvent, a sulfur-containing solvent, and a cyclic ester in a proportion of 40% or more relative to a total mass of an organic solvent contained in the composition.

11. The ink set according to claim 1, wherein the ink set is used for printing on a poorly absorbent or non-absorbent printing medium.

12. A printing method using the ink set as set forth in claim 1, the method comprising:
applying the ink composition onto a printing medium by an ink jet method; and
applying the treatment liquid composition onto the printing medium by an ink jet method.

13. The printing method according to claim 12, wherein the ink composition with a temperature of 20° C. to 45° C. is applied onto a printing medium with a temperature higher than the temperature of the ink composition by 0° C. to 5° C., and the treatment liquid composition with a temperature of 20° C. to 45° C. is applied onto the printing medium with a temperature higher than the temperature of the treatment liquid composition by 0° C. to 5° C.

14. The printing method according to claim 12, wherein printing is performed by repeating main scans and sub-scans, and
the ink composition and the treatment liquid composition are applied onto a same region of the printing medium by being ejected in an identical main scan.

* * * * *